(12) United States Patent
van der Laan et al.

(10) Patent No.: US 11,182,805 B2
(45) Date of Patent: *Nov. 23, 2021

(54) SYSTEM AND METHOD OF ENHANCING A LEAD EXCHANGE PROCESS

(71) Applicant: ReviMedia, Inc., New York, NY (US)

(72) Inventors: Alexander van der Laan, Almere (NL); Sabastiaan Offers, Brooklyn, NY (US)

(73) Assignee: ReviMedia, Inc., New York, NY (US)

( * ) Notice: Subject to any disclaimer, the term of this patent is extended or adjusted under 35 U.S.C. 154(b) by 956 days.

This patent is subject to a terminal disclaimer.

(21) Appl. No.: 15/720,044

(22) Filed: Sep. 29, 2017

(65) Prior Publication Data
US 2018/0096363 A1 Apr. 5, 2018

Related U.S. Application Data

(63) Continuation of application No. 14/496,120, filed on Sep. 25, 2014, now Pat. No. 9,785,956.

(60) Provisional application No. 61/882,959, filed on Sep. 26, 2013.

(51) Int. Cl.
G06Q 30/02 (2012.01)
G06F 17/16 (2006.01)
G06F 16/22 (2019.01)

(52) U.S. Cl.
CPC ..... *G06Q 30/0201* (2013.01); *G06F 16/2237* (2019.01); *G06F 16/2264* (2019.01); *G06F 17/16* (2013.01)

(58) Field of Classification Search
None
See application file for complete search history.

(56) References Cited

U.S. PATENT DOCUMENTS

| 6,078,892 | A  |   | 6/2000 | Anderson et al. |
| 6,377,993 | B1 | * | 4/2002 | Brandt ................ G06F 11/0709 709/227 |
| 6,735,610 | B1 | * | 5/2004 | Pelton ................... G06F 17/141 708/403 |
| 6,868,389 | B1 |   | 3/2005 | Wilkins et al. |
| 7,047,206 | B1 |   | 5/2006 | Schultze |
| 7,546,243 | B2 |   | 6/2009 | Kapadia et al. |

(Continued)

FOREIGN PATENT DOCUMENTS

| KR | 101581970 B1 * | 12/2015 | ........... G06F 3/0482 |
| WO | WO 2017/030872 | 2/2017 | |

OTHER PUBLICATIONS

Lead Liaison, "Building your Lead Scoring Matrix: What to Include". Best Practices, Lead Scoring, Revenue Generation Blog. https://www.leadliaison.com/best-practices/building-your-lead-scoring-matrix-what-to-include/ (Year: 2013).*

*Primary Examiner* — Shelby A Turner
(74) *Attorney, Agent, or Firm* — Knobbe, Martens, Olson & Bear, LLP

(57) ABSTRACT

A system and method of enhancing the lead exchange process simultaneously and in real-time calculates a quality index of a lead or plurality of leads within the lead exchange process. The quality index provide a measure of the quality of the leads with the lead exchange process. The calculations are done electronically by a computer system and are based on differences to the mean, allowing for relative indices, which permit the use in a dynamic environment.

20 Claims, 22 Drawing Sheets

(56) References Cited

U.S. PATENT DOCUMENTS

| | | |
|---|---|---|
| 7,596,501 B2 | 9/2009 | Tivey et al. |
| 7,599,842 B2 | 10/2009 | Tivey et al. |
| 7,752,236 B2 | 7/2010 | Williams et al. |
| 7,822,631 B1 * | 10/2010 | Vander Mey ...... G06Q 30/0201 705/7.29 |
| 7,904,335 B2 | 3/2011 | Crim |
| 7,970,690 B2 | 6/2011 | Diana et al. |
| 8,027,871 B2 | 9/2011 | Williams et al. |
| 8,135,607 B2 | 3/2012 | Williams et al. |
| 8,326,676 B2 | 12/2012 | Rose et al. |
| 8,352,215 B2 * | 1/2013 | Chen ...................... G06F 17/11 702/179 |
| 8,571,951 B2 | 10/2013 | Diana et al. |
| 9,665,874 B2 * | 5/2017 | Chau ................. G06Q 30/0255 |
| 2003/0208494 A1 * | 11/2003 | Francois Olivier .... G06Q 30/02 |
| 2004/0143473 A1 | 7/2004 | Tivey et al. |
| 2004/0143476 A1 | 7/2004 | Kapadia et al. |
| 2004/0143482 A1 | 7/2004 | Tivey et al. |
| 2004/0143483 A1 | 7/2004 | Tivey et al. |
| 2005/0005164 A1 | 1/2005 | Syiek et al. |
| 2005/0060313 A1 * | 3/2005 | Naimat ................. G06Q 30/02 |
| 2005/0065936 A1 | 3/2005 | Goering |
| 2006/0041500 A1 | 2/2006 | Diana et al. |
| 2006/0136324 A1 * | 6/2006 | Barry .................... G06Q 40/04 705/37 |
| 2006/0155642 A1 | 7/2006 | Petterson |
| 2007/0233559 A1 | 10/2007 | Golec |
| 2007/0233561 A1 | 10/2007 | Golec |
| 2007/0250769 A1 | 10/2007 | Bass et al. |
| 2007/0250783 A1 | 10/2007 | Wu et al. |
| 2008/0201203 A1 | 8/2008 | Rose et al. |
| 2008/0201204 A1 * | 8/2008 | Rose ................. G06Q 30/0201 705/7.29 |
| 2008/0243674 A1 | 10/2008 | Petterson et al. |
| 2008/0300962 A1 | 12/2008 | Cawston et al. |
| 2009/0018894 A1 * | 1/2009 | Zamani ................. G06Q 30/08 705/7.29 |
| 2009/0030779 A1 * | 1/2009 | Tollinger ........... G06Q 30/0225 705/14.1 |
| 2009/0132347 A1 * | 5/2009 | Anderson ............... G06Q 30/02 705/14.52 |
| 2009/0192880 A1 * | 7/2009 | Hood ................. G06Q 30/0601 705/347 |
| 2010/0057556 A1 | 3/2010 | Rousso et al. |
| 2010/0235204 A1 * | 9/2010 | Farkkila ................ G06Q 40/00 705/7.11 |
| 2011/0106607 A1 * | 5/2011 | Alfonso ............. G06Q 30/0224 705/14.25 |
| 2011/0196716 A1 * | 8/2011 | Srinivasan ......... G06Q 30/0201 705/7.29 |
| 2011/0196759 A1 | 8/2011 | McCollum et al. |
| 2011/0289106 A1 * | 11/2011 | Rankin, Jr. ........... G06F 16/284 707/769 |
| 2012/0179476 A1 * | 7/2012 | Muncy ............... G06Q 30/0207 705/1.1 |
| 2012/0290400 A1 * | 11/2012 | Hoke ..................... G06Q 30/04 705/14.66 |
| 2012/0290491 A1 | 11/2012 | Rafferty et al. |
| 2013/0117081 A1 | 5/2013 | Wilkins |
| 2014/0188969 A1 * | 7/2014 | Chotai .................... G06F 17/16 708/520 |
| 2014/0278800 A1 * | 9/2014 | Nguyen ............. G06Q 30/0205 705/7.34 |
| 2015/0046215 A1 * | 2/2015 | Crofts ................ G06Q 30/0201 705/7.29 |
| 2015/0082137 A1 * | 3/2015 | Zarpas ................. G06F 3/0484 715/212 |
| 2015/0178779 A1 | 6/2015 | Malone et al. |
| 2015/0228006 A1 | 8/2015 | Malone et al. |
| 2015/0264173 A1 | 9/2015 | Diana et al. |
| 2016/0328727 A1 | 10/2016 | Szulczewski et al. |
| 2016/0328720 A1 | 11/2016 | Kulpa et al. |
| 2016/0328721 A1 | 11/2016 | Kulpa et al. |
| 2016/0371724 A1 | 12/2016 | Kulpa et al. |

* cited by examiner

302 →

| | Parameter | Wt. | AUTO | HEALTH | PET | HOME | AUTO. | AUTO. | LIFE | HOMESECURITY | QIQ Lead | QIQ Origin | QIQ Buyer | Remarks |
|---|---|---|---|---|---|---|---|---|---|---|---|---|---|---|
| Stat'l | Average Validation Score | 15% | 500 | 500 | 500 | 500 | 500 | 500 | 500 | 500 | | | x | Expected average Validation Score for Leads (last 40 days) |
| | Average IP2State Check | 10% | 80% | 80% | 80% | 80% | 80% | 80% | 80% | 80% | | x | | Expected average IP2StateCheck (not mobile, callcenter) (last 40 days) |
| | Average Total Posts | 10% | 35 | 13 | 0 | 23 | 0 | 23 | 18 | 148 | | x | x | Average Leads Sold (calculated) |
| | Average Payout | 10% | 1.88 | 1.98 | 0 | 2.67 | 0 | 4.87 | 1.59 | 12.33 | | x | x | Average payout of Leads (calculated) |
| | Acceptance rate | 18% | 70% | 39% | 91% | 75% | 20% | 52% | 44% | 100% | | | | Acceptance rate (last 40 days) |
| | Dupe filter | 2% | 1% | 1% | 2% | 1% | 5% | 12% | 2% | 1% | | | | Duplicate percentage (last 40 days) |
| | Validation Score too low | 5% | 4% | 3% | 22% | 6% | 4% | 18% | 6% | 3% | | | | Validation score too low (last 40 days) |
| | Conversion | 25% | 65% | 35% | 67% | 68% | 11% | 22% | 36% | 96% | | x | x | Conversion based on above statisticsFeedbackLead |
| Feed. | Lead Returns | 30% | 22% | 4% | 0% | 23% | 0% | 6% | 23% | 4% | | x | x | Average from reporting period |
| | Valid reasons% | | 100% | 100% | 100% | 100% | 100% | 100% | 100% | 100% | | x | x | Impact: Full to Origin, Semi to Buyer |
| | Neutral reasons% | | 0% | 0% | 0% | 0% | 0% | 0% | 0% | 0% | | x | x | Impact: Full to Origin, Full to Buyer |
| | Invalid reasons% | | 0% | 0% | 0% | 0% | 0% | 0% | 0% | 0% | | x | x | Impact: Not to Origin, Full to Buyer |
| | Parent% | | | | | | | | | | | x | | If origin too small. Differs per parent obv'ly |
| | Reporting Period | | 22.08% | 4.48% | 0.00% | 23.28% | 0.00% | 6.12% | 23.06% | 4.45% | | x | x | Return payout% last return period |
| | IVR Verification correction | | 0% | 0% | 0% | 0% | 0% | 0% | 0% | 0% | | x | x | Influences the final valid and invalid reason% |
| Oper'l | Session length | 10 | | | | | | | | | x | | | Primarily bot/fraud detection mechanism |
| | Time of day | 5 | | | | | | | | | x | x | | Actually 2 parameters: TOD and timezone |
| | Num. of altered def. vals. | 5 | | | | | | | | | x | | | Primarily bot/fraud detection mechanism |
| | Prepopped form | 5 | | | | | | | | | x | | | Whether Address data was prepopped through some mechanism |
| | Phone to address | | | | | | | | | | x | x | | Whether Address data was prepopped through phone lookup |
| | Endpage click percentage | 20 | | | | | | | | | x | x | | The clickthrough rate on the endpage |
| | Availability of Lead ID (opt'l) | 2 | | | | | | | | | x | | | Whether the external LeadID was present |
| Probab. | Lead Validation Score | 35 | | | | | | | | | x | | | Validity score of the LeadData (primarily address) |
| | Lead IP2State Check | 5 | | | | | | | | | x | | | Check for IP based US State versus supplied USState |
| | check for Call Center/mob. | | | | | | | | | | x | | | Callcenters and Mobile origins have bad IP2State! |
| | State/Zipcode | 5 | | | | | | | | | x | | | Check USSTATE on supplied Zip Code |
| | Phone Type | 1 | | | | | | | | | x | | | Type of phone used (mobile, prepaid, etc.) |
| | Phone Carrier | 4 | | | | | | | | | x | | | The carrier (AT&T, Verizon, etc.) |
| | Age | | | | | | | | | | x | | x | Age of person in Lead |
| | Income | | | | | | | | | | x | | x | Usually based on credit rating |
| | Housing situation | | | | | | | | | | x | | x | Own house, rented, etc. |
| | Request data qual. (e.g. make) | | | | | | | | | | x | | x | e.g. BMW vs Audi |
| De-duced | Quality Lead | | | | | | | | | | | | | |
| | Quality Origin | | | | | | | | | | | x | | e.g. a bad lead from a good origin is upped |
| | Quality Buyer | | | | | | | | | | | | | e.g. a good Lead from bad origin is downed |

FIG. 20

| ReviStandard | Validity | CallCenter | Remark |
|---|---|---|---|
| Above Daily Limit | Invalid | | The Lead could be great, the Publisher can't help it |
| Bogus | Valid | | |
| Did Not Request | Neutral | | |
| Duplicate | Neutral | | Might not be known in advance by the Publisher could be malicious though |
| Incentivized | Valid | | |
| Insured with carrier already | Invalid | | The Publisher couldn't possibly have known this |
| Invalid Consumer Information | Valid | check | |
| Invalid Contact Details | Valid | check | |
| Language Barrier | Invalid | check | The Lead could be great, the Publisher can't help it |
| Phone number is disconnected | Valid | check | |
| Filter does not match | Neutral | | |

FIG. 21

SYSTEM AND METHOD OF ENHANCING A LEAD EXCHANGE PROCESS

INCORPORATION BY REFERENCE TO ANY PRIORITY APPLICATIONS

This application is a continuation of U.S. patent application Ser. No. 14/496,120, filed on Sep. 25, 2014, titled "System and Method of Enhancing a Lead Exchange Process", which claims the benefit of priority under 35 U.S.C. § 119(e) of U.S. Provisional Application Ser. No. 61/882,959, filed on Sep. 26, 2013, titled "System and Method of Enhancing a Lead Exchange Process", each of which is hereby incorporated by reference in its entirety. Any and all applications for which a foreign or domestic priority claim is identified in the Application Data Sheet as filed with the present application are hereby incorporated by reference under 37 CFR 1.57.

BACKGROUND

Field

The invention is directed to a system and method of enhancing a lead exchange process. In particular, the method simultaneously and in real-time calculates a quality index, and thus quality measure, of a lead or plurality of leads within the lead exchange process.

Description of the Related Art

Businesses, or other commercial entities, that sell products and/or services may acquire information regarding potential customers, clients or business associates from several sources. For example, information regarding a potential customer, client or business associate, referred to herein as a "lead," may be shared among related businesses. Alternatively, leads may be acquired through marketing efforts by the business, such as radio advertisements, Internet advertising or seminars where lists of leads are produced through the marketing efforts. Additionally, leads may be acquired from other sources, such as, but not limited to, newspapers, magazines, trade journals and/or websites. Leads may be acquired in any of these manners, or in other manners, by lead brokers that specialize in compiling leads and selling the leads to other entities. Thus, leads may be acquired from various sources.

The information included in a lead commonly includes contact information regarding the potential customer, such as a telephone number, residential address and/or email address. However, depending on the source of the lead, this contact information may be incomplete or incorrect, thus making the task of contacting the lead difficult. For example, if a lead does not include a telephone number or includes an incorrect telephone number for the potential customer, the business may need to do further research locating the correct phone number or may not be able to contact the potential customer. If the contact information is missing or incorrect in a lead, the business potentially loses not only costs associated with acquiring the lead, but also costs associated with attempting to contact the lead and/or researching the correct contact information for the lead.

Depending on the source of leads, a lead list may comprise one or more leads that include information that does not accurately correspond with the potential customer. For example, businesses or lead brokers may acquire leads through marketing efforts wherein a potential customer provides contact information in exchange for free or discounted products or services. However, potential customers often realize that by providing their contact information, there is a possibility that later communications from the business, lead broker or other entity to which the contact information is sold may be received. Accordingly, if a potential customer does not want to risk any subsequent contacts, the potential customer may provide a false name, address and/or other contact information to the business or lead broker. Alternatively, the potential customer may not provide any telephone, address and/or other contact information. Accordingly, leads comprising this missing and/or inaccurate information do not provide the business using the lead with information that allows them to contact the potential customer and, thus, are of little or no value to the business.

U.S. Pat. No. 8,271,313 discloses a system and method of enhancing leads by determining propensity scores. The patent discloses a method in which a client transmits one or more lead records to a lead enhancement module that is configured to enhance the received lead records and return enhanced lead records to the client. The lead enhancement module may return a contactability score for each lead record, indicating a likelihood that the individual identified in the lead may be contacted using the contact information provided in the lead record and/or additional contract information located by the lead enhancement module. The lead enhancement module may also receive additional data items associated with leads from one or more data sources. Additionally, statistical models that may be customized for each client may be applied to information associated with lead records in order to determine one or more propensity scores for each of the lead records, where a propensity score indicates a likelihood that an individual will take a particular action, such as purchasing particular goods or services.

While such lead enhancement is beneficial, it is time consuming to enhance a large batch of leads, and it is cumbersome to modify to provide targeted and specific results which are beneficial to the client. It would therefore be beneficial to provide a system and method of enhancing a lead exchange process which, in real-time, calculates a quality index, and thus quality measure, of a lead or plurality of leads within the lead exchange process, thereby enhancing the quality of the leads supplied to the customer.

SUMMARY

An embodiment is directed to a mechanism, system and method which simultaneously and in real-time calculate a quality index, and thus quality measure, based on aspects which are important to the lead generation process. These aspects include, but are not limited to, the offering publishers, the lead itself, the lead buyers, the brokers and the separate verticals.

The invention does not focus on a single lead but on the whole lead process from start to end.

The quality index calculation is based on differences to the mean (i.e. relative values, not absolute values). Using the relative values allows the invention to quickly and accurately function in an ever changing and highly dynamic marketplace.

The invention allows for process monitoring, control and an optimal match of sources or origins of leads and generating large quantities of leads to destinations (such as buyers of the leads) while simultaneously registering the quality of each individual lead.

In various embodiments, pluggable sub-processes are used to perform lead validation, enhancement and augmentation activities. The system receives the result of these sub-processes and calculates a value to a corresponding parameter that is used by the system algorithms to calculate the quality indices for the different aspects.

The number and nature of sub-processes is transparent to the invention and unlimited by design. It is the combination of the defined calculation, the weight factor and the value of the resulting parameters that determines the actual influence on the resulting quality indices.

The system is configured to allow various present and future influencing parameters to be added to the calculation and their impact on the indices can be configured without changing the system itself. The invention is thus fully adaptable and extensible.

To achieve the above, a non-linear algorithm gets or retrieves input for a number of different parameters. In one illustrative embodiment, approximately 100 direct and deduced parameters are implemented. These parameters are grouped into categories, such as, but not limited to: statistical data, feedback data, operational data and probability data.

Each parameter has its own weight within the algorithm and its own basic calculation formula. Various parameters may be built from multiple sub-parameters. For example, in one illustrative embodiment, the name and address verification score is one parameter but incorporates the first name, last name, address, zip code, etc. from various sub-parameters.

All parameters in all categories are calculated for all mam aspects simultaneously, as far as they are applicable. These parameters may be derived from different sources, both internal and external. Examples of illustrative embodiments include, but are not limited to:

User behavior through operational data points: matching of location and current address, session length, click listings to measure the intent of the user, etc.

Probability data points: demographics, lifestyle parameters, etc.

Data verification: contact data verification and augmentation through sub-processes fully integrated within the system.

Feedback scoring: real time processing of return data from connected buyers. Different return reasons are handled differently in the scoring.

Automation: having buyers matched to the best sources by automating the matching of the buyer with top performing sources.

The number of parameters may increase over time as more measurement points become available and insight into the exact nature of the business enhances. These parameters are evaluated differently per vertical to closely adapt to the specifics of the segmented marketplace. In various illustrative embodiments, based on the nature of the lead exchange process relevant statistical data may range up to 40 days. Relevant historical data may range up to 90 days. Older data is less likely to be of interest due to the fast changing market.

Given hundreds of thousands of leads, thousands of publishers, buyers and brokers and hundreds of verticals, the invention is internally designed to process data in an incremental fashion. It is simply not possible to recalculate millions and millions of data points in real-time.

An embodiment is directed to a model, system and method to achieve real-time calculations and results. Input parameters are organized in cells. Every cell has its own input parameter, weight and algorithm. By the nature of the process cells can all differ in type weight and severity. Cells are organized in arrays of cells, like a row, with the dominant (or first) cell of the array holding the algorithm and values tying the cells in the array. The rows are again organized in columns, effectively creating a matrix. The dominant row (or first) row holding the algorithm and values for the matrix. Multiple matrices are combined, forming a multi-dimensional matrix, again holding their own algorithm and weight. Depending on how a multi-dimensional matrix is combined and the point on the multi-dimensional matrix that is inspected, the indices are obtained for the various main aspects of the process.

To dramatically reduce the number of calculations necessary the model, system and method are configured to only recalculate the cell, array value, matrix and multi-dimensional matrix that are affected by the change. It does this through inverted calculation of the outcome.

An example of a simple illustrative embodiment is as follows:

An array is originally calculated by multiplying all values in the array with each other to render an array product: $Result_o = A*B*C*D*E$ If the value of input parameter 'E' changes rather than repeating the entire calculation ($Result_n = A \times B \times C \times D \times E_{new}$), the model, method and system of the present invention would invert the calculation ($Result_n = (Result_o / E) \times E_{new}$). This effectively reduces the number of operations in the calculation from 4 to 2.

However, if the array would have been 100,000 cells long the reduction in the number of operations in the calculation is very efficient: reducing the number of operations from 99,999 to 2.

Calculating cells to arrays, arrays to matrices, matrices to multi-dimensional arrays and multi-dimensional arrays to final system indices is based on similar methods. This allows 8 to 10 (often simple) calculations to be sufficient to recalculate the influence of millions and millions of input parameters, which can be considered 'real-time' given the speed of modern CPUs.

An embodiment is directed to a method of enhancing a lead exchange process which includes simultaneously and in real-time calculating a quality index of a lead or plurality of leads within the lead exchange process.

The calculations are done electronically by a computer system and are based on differences to the mean, allowing for relative indices, which permit the use in a dynamic environment.

The method may include pluggable sub-processes which provide input for the calculation process.

The method is configured to process data in an incremental fashion.

The method and process retrieves input for a number of different parameters. The parameters may be grouped into categories, which include statistical data, feedback data, operational data and probability data. Each parameter has its own weight within the lead exchange process and its own basic calculation formula. Respective parameters are often built from multiple sub-parameters.

Each parameters may be organized in cells, with each cell having its own input parameter, weight and algorithm, and with each cell differing in type, weight and severity. The cells may be organized in arrays of cells, which may be organized in rows. The rows may be organized in columns, creating a matrix.

An embodiment is directed to a computerized system of enhancing a lead exchange process, the system include a calculation process which simultaneously calculates a quality index of a lead or plurality of leads within the lead exchange process, wherein the quality index provide a measure of the quality of the leads with the lead exchange process.

An embodiment is directed to a computerized system of enhancing a lead exchange process, the system in real-time calculates a quality index of a lead or plurality of leads within the lead exchange process, wherein the quality index provide a measure of the quality of the leads with the lead exchange process.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 20 is a table illustrating various parameters and weights associated with one illustrative embodiment.

FIG. 21 is a table listing representative reasons for returns of leads and their associated classification.

DETAILED DESCRIPTION

Embodiments of the invention will now be described with reference to the accompanying Figures, wherein like numerals refer to like elements throughout. The terminology used in the description presented herein is not intended to be interpreted in any limited or restrictive manner simply because it is being utilized in conjunction with a detailed description of certain specific embodiments of the invention.

Furthermore, embodiments of the invention may include several novel features, no single one of which is solely responsible for its desirable attributes or which is essential to practicing the inventions herein described.

High Level Overview and Process flow

Figure 1:
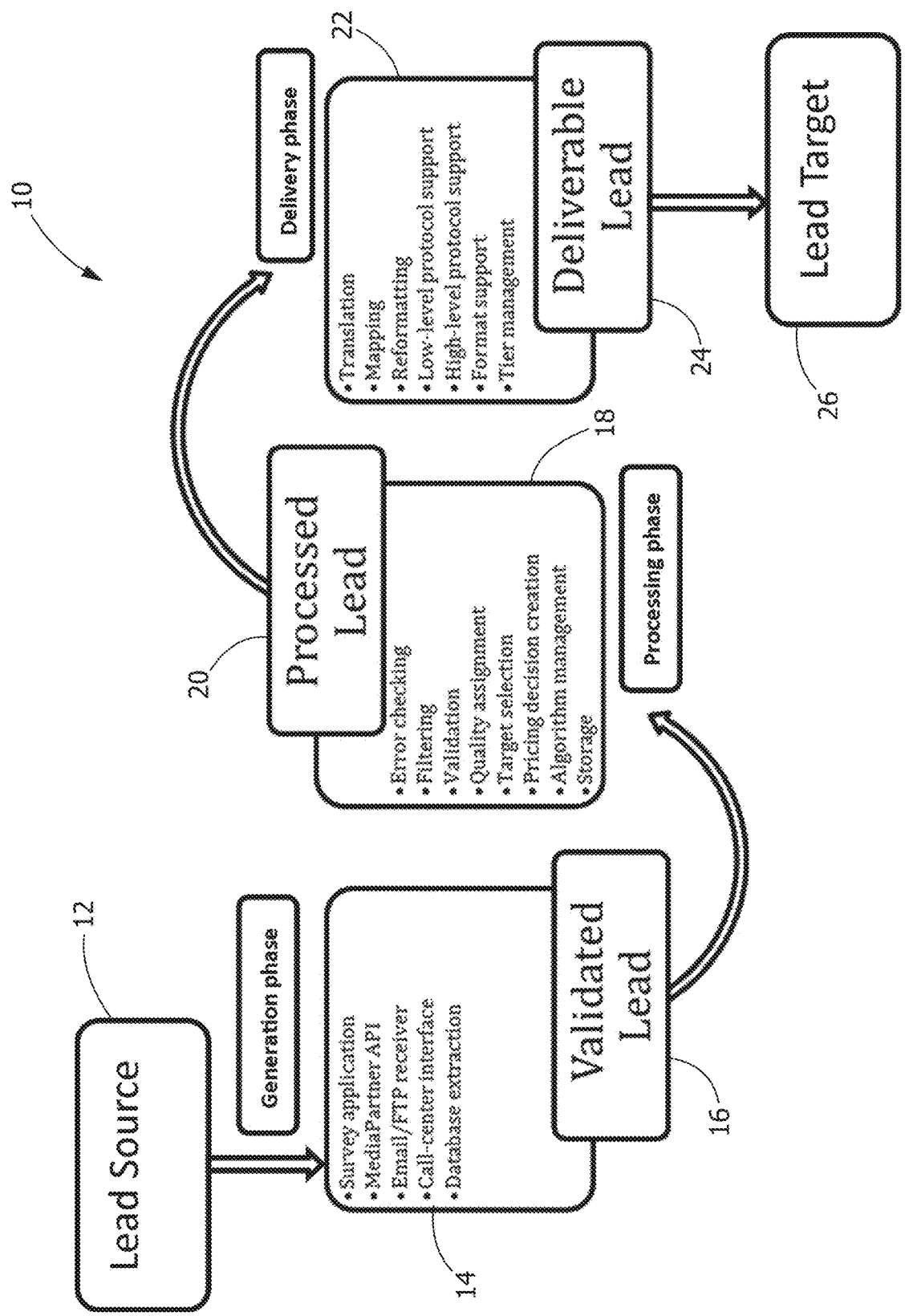
FIG. 1 is a block diagram of a high level overview of the process.

As shown in FIG. 1, a lead exchange/enhancement platform or module 10 receives information from a lead source 12, generates and validates the lead 14 to establish a validated lead 16. The validated lead is processed 18 to establish a processed lead 20. The processed lead is sent to a delivery phase 22 which manipulates the lead into a deliverable lead 24 which can be sent as a lead target 26.

The lead exchange/enhancement platform or module 10 FIG. 1 is in communication with a network and various networked devices through which the information is received from the lead source 12. In one embodiment, the lead exchange/enhancement platform or module 10 comprises a computing device configured to perform one or more verification, validation and/or enhancement operations on a lead. In general, a lead record may be in either paper format, such as information regarding a potential customer printed on a piece of paper, or in an electronic format, such as a record in a database that may be stored, manipulated, transferred, and viewed.

In one embodiment, the lead exchange/enhancement platform or module 10 is in communication with the lead sources 12 and the lead targets 26 via a secured network, such as a local area network. In other embodiments, the lead sources 12 and the lead targets 26 may communicate with the lead exchange/enhancement platform or module 10 via an unsecured network rather than, or in addition to, the secured network. In one embodiment, the lead exchange/enhancement platform or module 10 communicates with the lead sources 12 and the lead targets 26 via an unsecured network using a secured data protocol, such as data encryption, for the data transmitted on the unsecured network. The lead sources 12 and the lead targets 26 may comprise any number of data repositories storing information regarding individuals, such as financial, credit and biographical data.

In the illustrative embodiment shown, the lead is generated through filling out an electronic form, such as, but not limited to, an Internet browser. The form may be, but is not limited to, a publishers publish appropriate form with fields for different data that is relevant for the final destination of the lead to be processed. In general, various fields, such as, but not limited to, name, address, zip code, phone number, etc. are asked on the form next to specific data pertaining to the nature of the product of interest. However, the specific data requested and completed can vary greatly. As an example, in the case of a 'new car' inquiry, requested data will concentrate on brand and model whereas in the case of 'home insurance' the focus will be on the dwelling characteristics. Once filled out, the electronic form will be sent to the lead exchange/enhancement platform or module 10 by way of a network. The platform or module 10 will validate the information in the validation module 14 to generate a validated lead 16.

The validated lead 14 is sent through the processing module 18. The processing module 18 will check the data for errors, check for fraud, perform filtering based on different parameters, validate the data, augment possible missing data (e.g. state and city when zip code is known) and attach a quality measure to the individual lead. Other processes may also be performed in the processing module 18 without departing from the scope of the invention.

If a processed lead 20 is generated, the delivery module 22 will determine what the best time is to forward the deliverable lead 24 to interested parties, buyers or lead target 26. In addition, the delivery module 22 will determine the appropriate price level of the deliverable lead 24. The delivery module 22 will also determine which of the interested parties, buyers or lead target 26 should receive the deliverable lead 24. Other processes may also be performed in the delivery module 22 without departing from the scope of the invention The process flow the lead exchange/enhancement platform or module 10 is better shown in FIG. 2. The deliverable lead 24 can translated, mapped, reformatted and sent using the determined protocol as designated by the lead target 26. In the embodiment shown, interested lead targets 26 reply to an inquiry from the lead exchange/enhancement platform or module 10 with a bid for the deliverable lead 24. In the illustrative embodiment shown the highest bid wins the deliverable lead 24. The deliverable lead 24 is then sent to the winning lead target 26 and the sale is complete. However, other business models regarding the sale of the deliverable leads 24 may be used without departing from the scope of the invention.

Figure 2:
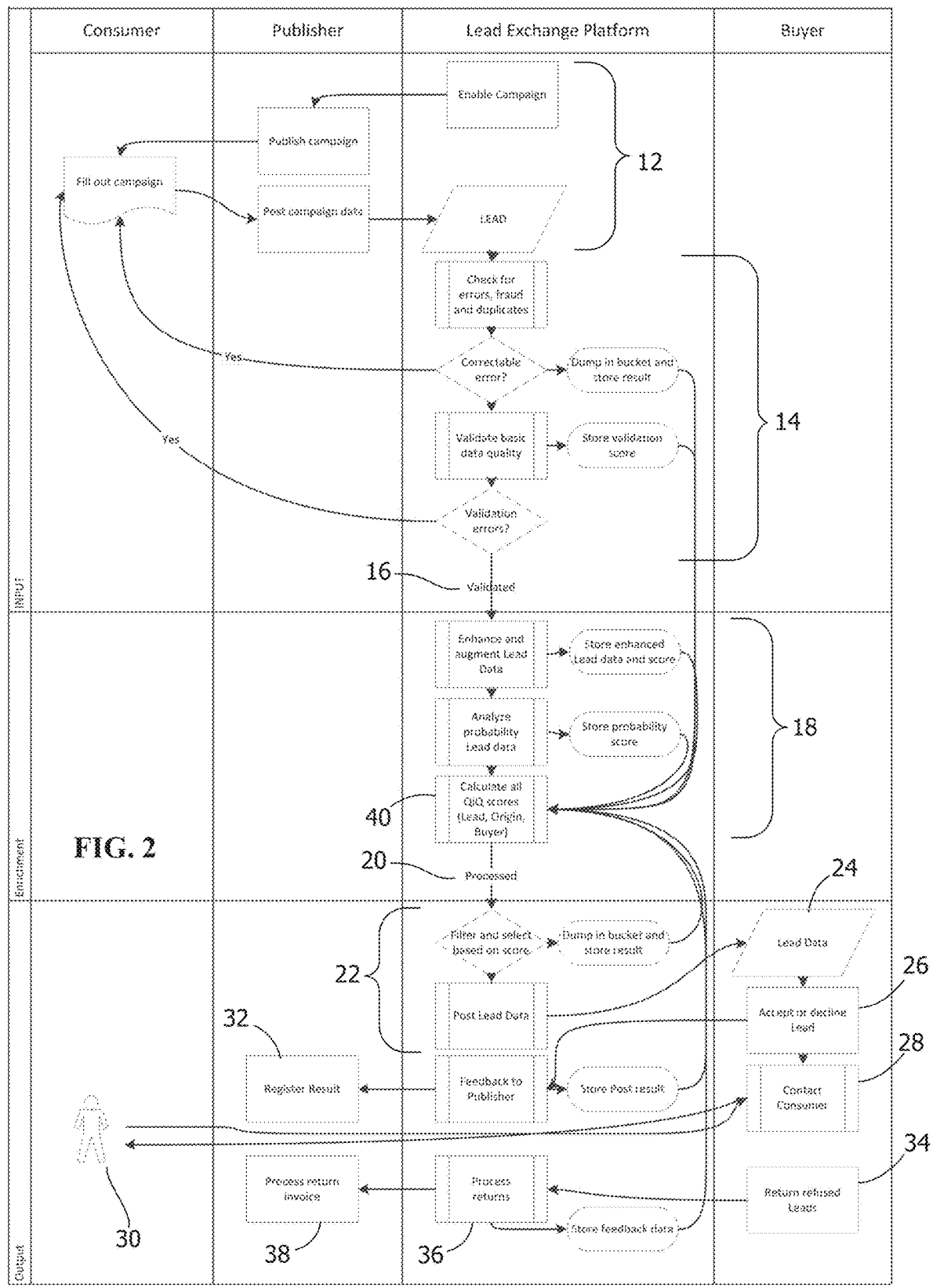
FIG. 2 is a flowchart illustrating an illustrative embodiment of the process and the enrichment module relative to the input and output.

As best shown in FIG. 2, the winning lead target 26 or buyer contacts, as represented by 28, the original consumer 30 to transform the purchased deliverable lead 24 into a product sale, usually through phone or email contact. However, other known methods of contacting the consumer can be used.

On the embodiment shown, the publisher or original lead source 12 is compensated for the information, as represented at 32, by receiving a fixed amount or a percentage of the sale of the deliverable lead 24 which originated from the original lead source 12. However, other methods of rewarding the lead source 12 can be used.

At various time intervals, e.g. once per month, the lead targets or buyers 26 may return deliverable leads 24 where not able to processed, as represented at 34. A description of the reason for the return of such returned deliverable leads 24 accompanies the returned deliverable leads 24. The returned deliverable leads 24 are evaluated, box 36, and if possible charged against fees due to the publisher or lead source 12, box 38.

During the entire process associated with the lead exchange/enhancement platform or module 10, records are created and updated for each lead, returned lead and every sales transaction. These records allow for close monitoring of the entire process associated with the lead exchange/enhancement platform or module 10, including, but not limited to, the reporting of results and the verification of the information.

The information or data for each lead is as detailed as possible including, but not limited to, sales related data and quality indices, such as consumer session length and browser type, as will be more fully described.

As will be more fully described below, the lead records are used for the quality scoring process. The information/data in the lead records is evaluated in real-time to calculate the quality scores for an individual lead. In addition the information/data provided in the system allows for real-time evaluation of every publisher or lead source 12 and buyer or lead target 26. The quality scoring of the leads, box 40, is an integral part of the process flow of the lead exchange/enhancement platform or module 10 and serves as input for decision making associated with the system, e.g. pricing and connection selection.

System Calculations and Data Hierarchy

Figure 3:
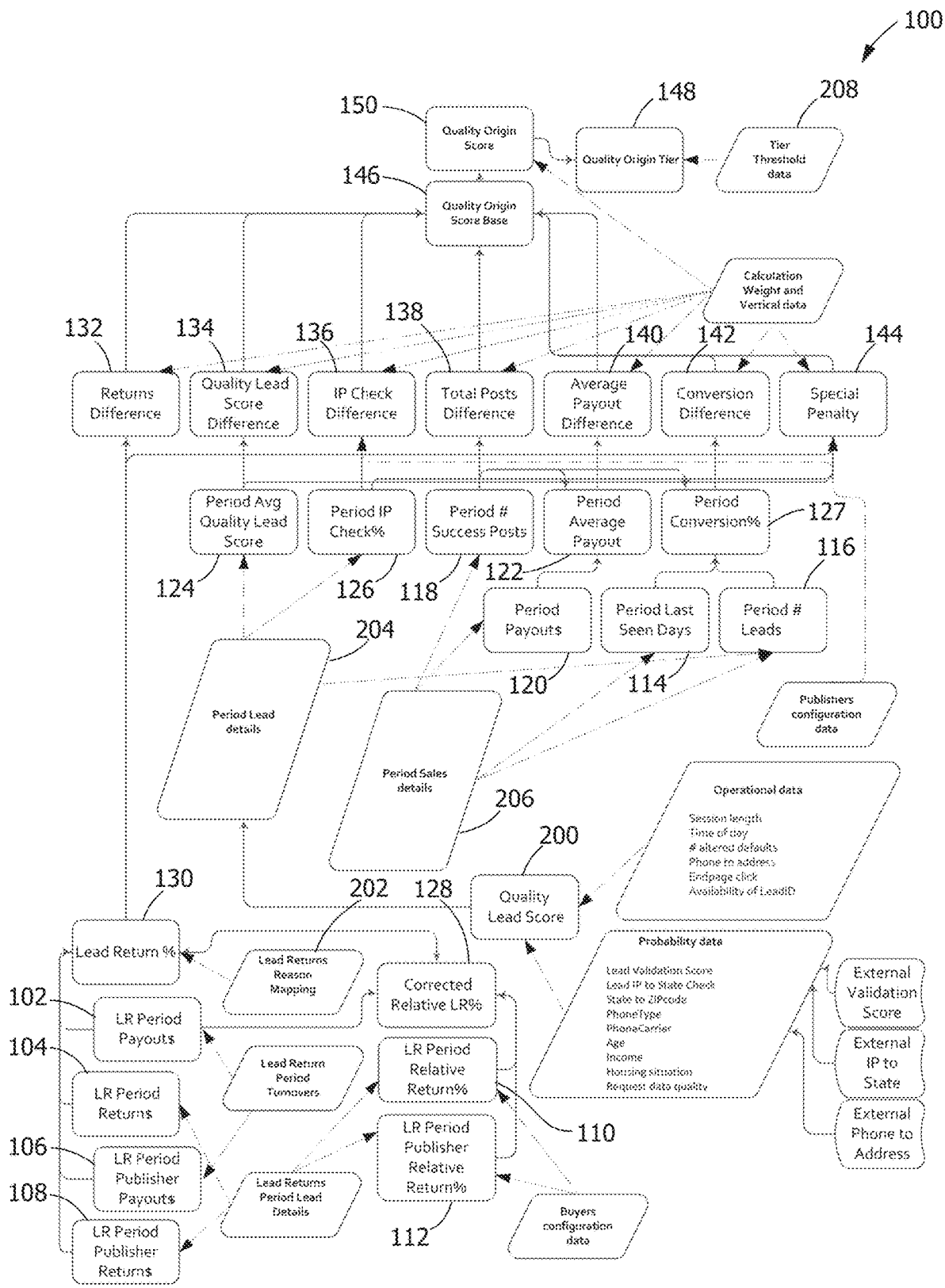
FIG. 3 is a flowchart illustrating the system calculations and data hierarchy.

FIG. 3 provides an overview 100 of the various calculations and their hierarchy as used in the lead exchange/enhancement platform or module 10. For a proper understanding of the hierarchy, FIG. 3 should be read from bottom to top, and thus in numerical order from 102 to 150.

Figure 19:
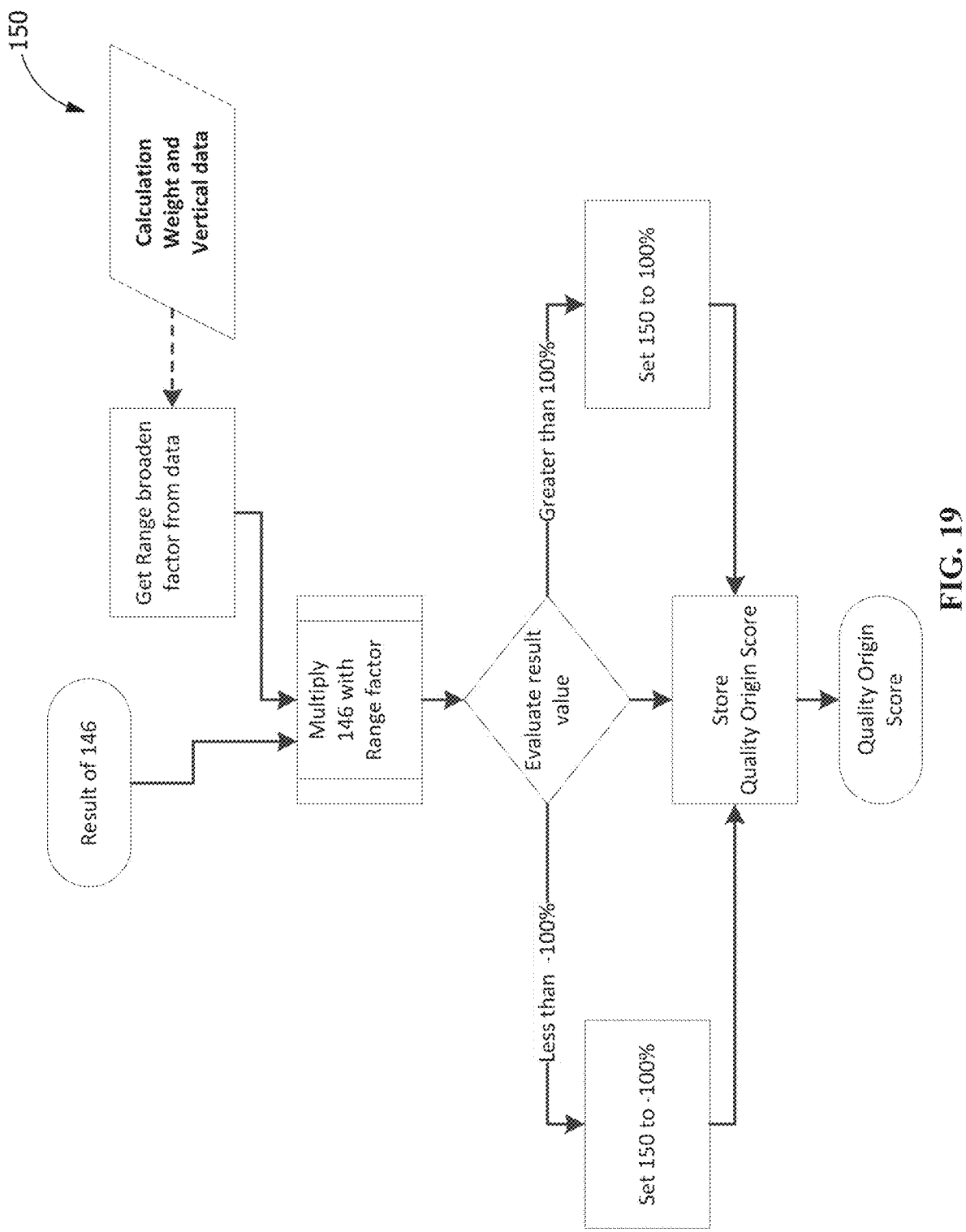
FIG. 19 is a flowchart illustrating one method of calculating a quality origin score.

The lower level calculations serve as input for the higher level calculations until the top or quality origin score 150 (FIG. 19). The quality origin score 150 is the current real-time quality score for a unique source (publisher), sub-source, campaign and vertical combination.

As is shown in FIG. 3, square boxes with round corners depict a calculation that calculates a specific value that serves as input for a hierarchically higher calculation. Slanted boxes depict a data or meta-data collection that holds records with 'input' data that was either collected and stored during the lead exchange process associated with the lead exchange/enhancement platform or module 10 or was configured by operators (meta-data) of the lead exchange/enhancement platform or module 10. Boxes with arcuate edges depict data that is brought into the process from external sources, i.e. phone number to address, where a phone number is sent to an external party and (if found) the address data is returned.

The calculations are split in two distinct sets: the database direct calculations and the system calculations. This is a technical distinction, not a functional one.

The database direct calculations are generally fitted in SQL queries with grouping, using aggregator functions such as, but not limited to sum, count and average. This allows for the calculation of simple input values over a longer period of time per unique source (publisher), sub-source, campaign and vertical combination. Examples of such input values are the period number of leads (calculation 116) and period payout amount (calculation 120).

Others database direct actions are the result of a simple lookup. For example the lookup of weight and vertical (meta-data) that is used to configure and tune the calculations.

These queries are often performed outside the main process and the results are stored in tabular form as persisted electronic objects. These objects can be loaded into memory and referenced quickly during the main calculation. They are recreated (refreshed) at defined intervals that range from seconds to minutes depending on the need. For example, in one illustrative embodiment, sales details must be as real-time as possible so are recreated on a seconds interval. In contrast, configuration data is recreated every 5 minutes.

In the embodiment shown, given that the quality lead score calculation is based on a longer period (e.g. 40 days), shorter calculation intervals are not necessary since increase of decline in score will be gradual due to the history effect. In addition, the quality lead score is not published until a certain threshold of processed leads is reached (e.g. 25) for a unique source (publisher), sub-source, campaign and vertical combination. Below the threshold there is no statistical significance.

In FIG. 3, dotted lines are used to indicate input from direct databases and the like which is used as input to enable the respective calculations to which they used. The calculations are individually described more fully below. A solid line indicates that the results of the calculations are used as input for further calculations.

Description of the Calculation Flow FIGS. 4 Through 18.

As stated earlier the calculations should be viewed bottom to top. The description is starting at the right bottom.

External data is collected or generated as a result of a request to an external service or lead source 12 and stored in the database with the lead. The request may be, but are not limited to Internet based HTTP GET or POST request. The information gather from the lead source 12 may include, but not limited to, address validation, email validation and check, phone to address, phone connection status, IP address to State, etc.

Other data stored with the lead may be collected through the processing of the form itself and from information gathered during the forms code execution. This data is usually referred to as operational data and consists of, but is not limited to, session length, time of day and time zone, number of altered defaults on the form, etc. Also the specific data for the vertical, as obtained from the fill-out data on the form, is stored with the lead. This is a wide array of data and could include, but is not limited to, age, income, housing situation, etc.

Based on the above lead data the lead quality score is calculated. The lead quality score is a value between 0 and 100, where 0 is very bad and 100 is excellent. The scores calculation is not part of this document but is rather straightforward and is known in the industry. For every input data point a score is added or subtracted to a total based on averages that are known in the system for a certain data point.

The final result of the calculation is the quality lead score 200 for an individual lead. This quality lead score 200 is stored with the lead and is an important input parameter to the remainder of the calculations.

In the bottom left of FIG. 3 lead returns 202 are collected. In one illustrative embodiment, the returns are uploaded in batches to the system 100 on a per buyer or lead target 26 basis. This is done for a distinct period, usually a month. The system next calculates per unique source (publisher), sub-source, campaign and vertical combination the turnover (sales value) for the period belonging to the lead returns and the value of the leads returned 102, 104, 106, 108. Also return percentages are calculated based on the sell and return amounts 130 (FIG. 9) (not on the number of leads).

This is done both for the unique source (publisher), sub-source, campaign and vertical combination and for each publisher or lead source 102 as a whole. This to prevent unique source (publisher), sub-source, campaign and vertical combinations with very small amount of leads in the period to be valued too high or too low. When the amount is too small the publisher as a whole value is taken 110, 112.

In addition, a correction calculation 128 (FIG. 8) is made based on the relative lead return percentage due to buyer behavior. As an example, assume that a first lead target or buyer 26 returns 30% of its leads and a second lead target or buyer 26 returns 10%. If a publisher or lead source 12 is only connected to the first second lead target or buyer 26 its lead return percentage would be higher than if the publisher or lead source 12 is connected to would have been connected to the second lead target or buyer 26. For this reason a correction value is calculated 128 (FIG. 8) that compensates for the lead target or buyer differences. As the publisher or lead source 12 leads go to a wide mix of targets or buyers 26, the relative correction is an integral and important step in the calculation. As shown in FIG. 3, the correction calculation 128 are correlated with the reason mapping 202 to ensure that the correction calculation 128 honors or includes only valid lead returns and dismisses or does not include invalid lead returns.

Using the information, calculations and output described above for the lead returns, the system 100 calculates the lead return percentage 130 (FIG. 9) per unique source (publisher), sub-source, campaign and vertical combination.

Figure 6:
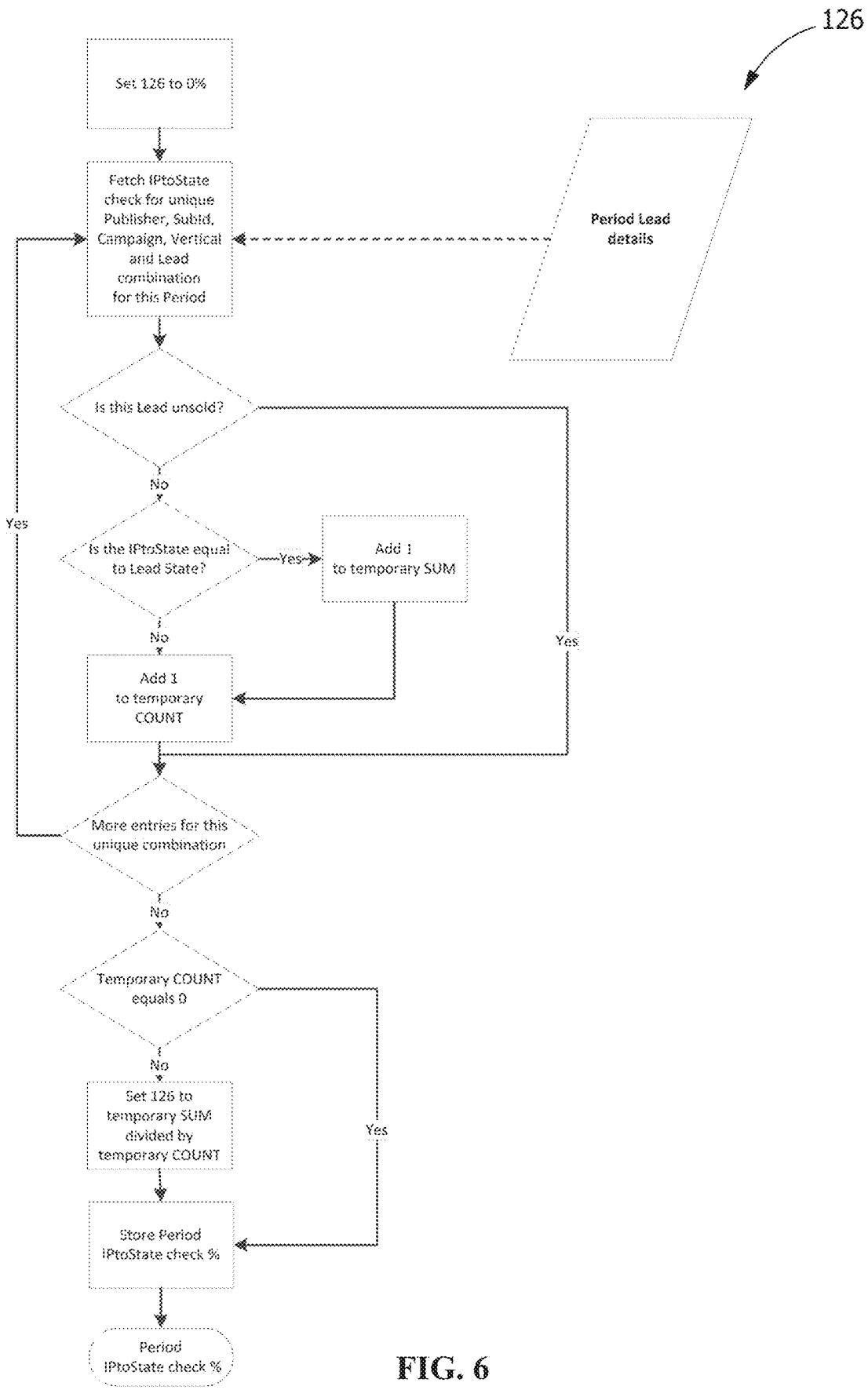
FIG. 6 is a flowchart illustrating one method of calculating an IP check percentage.

Using defined period lead 204 details, as stored in the system 100, the next calculations/aggregations are performed per unique source (publisher), sub-source, campaign and vertical combination. These calculations include the average quality lead score 124 (FIG. 5) and the period IP to state correctness percentage 126 (FIG. 6).

Using the defined period sales 206 details, as stored in the system 100, the next calculations/aggregations are performed per unique source (publisher), sub-source, campaign and vertical combination. These calculations include the period number of success posts (sale) 118, the period payout 120, the period last seen days 114 and the period number of leads 116.

Figure 4:
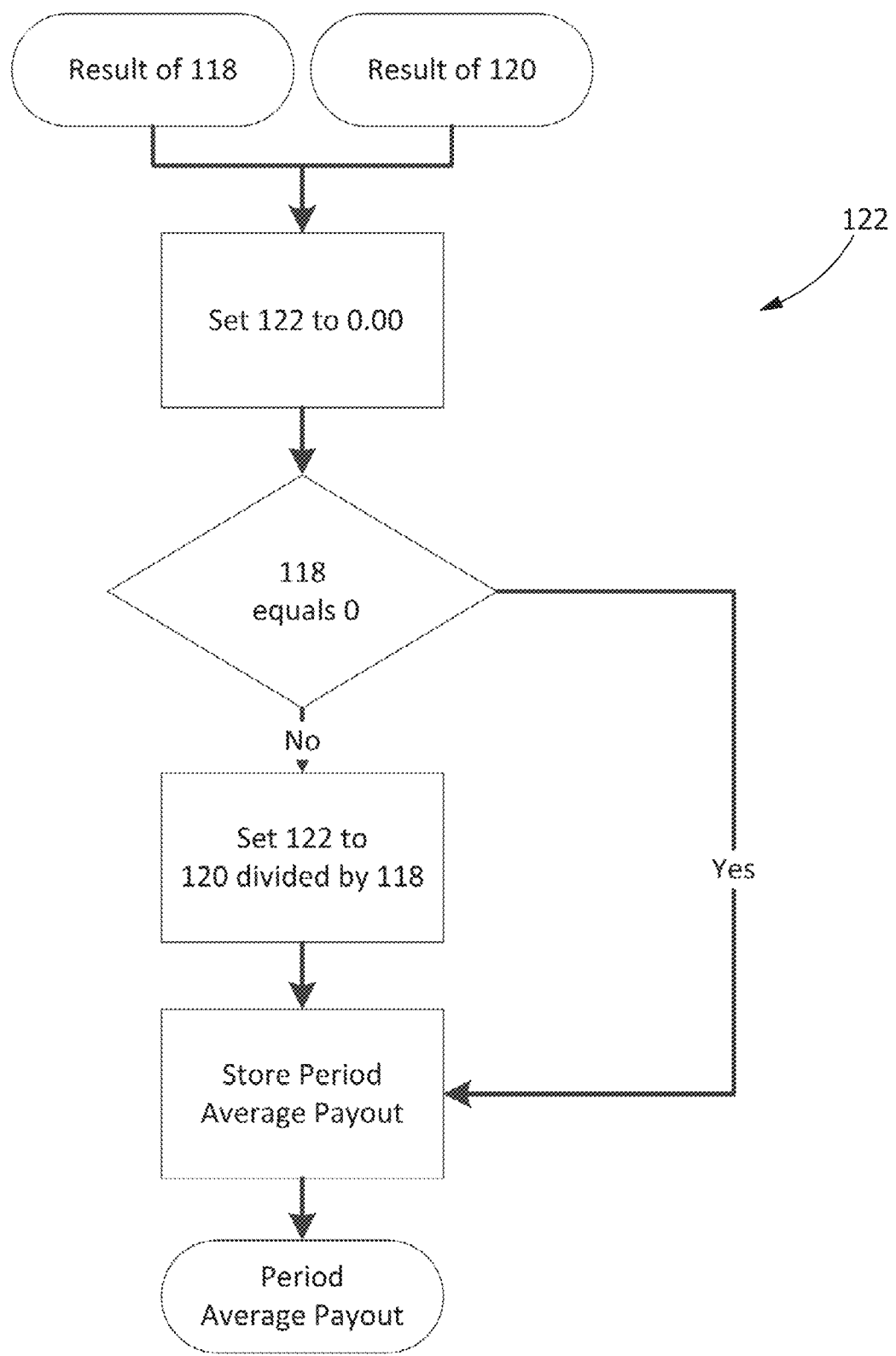
FIG. 4 is a flowchart illustrating one method of calculating an average payout.
Figure 5:
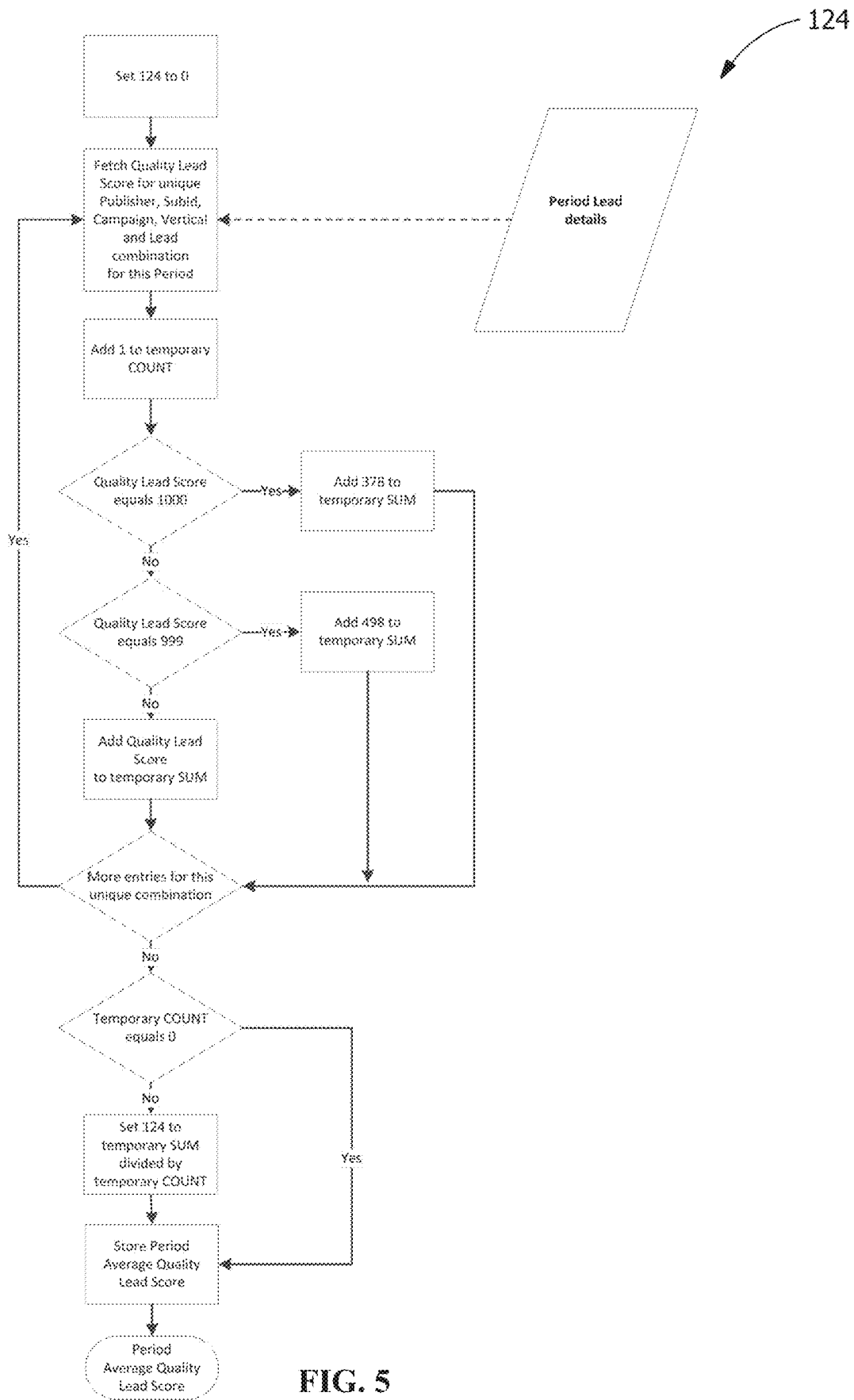
FIG. 5 is a flowchart illustrating one method of calculating an average quality lead score.

Calculation 118 and calculation 118 render the input necessary to calculate the period average payout 122 (FIG. 4).

Figure 7:
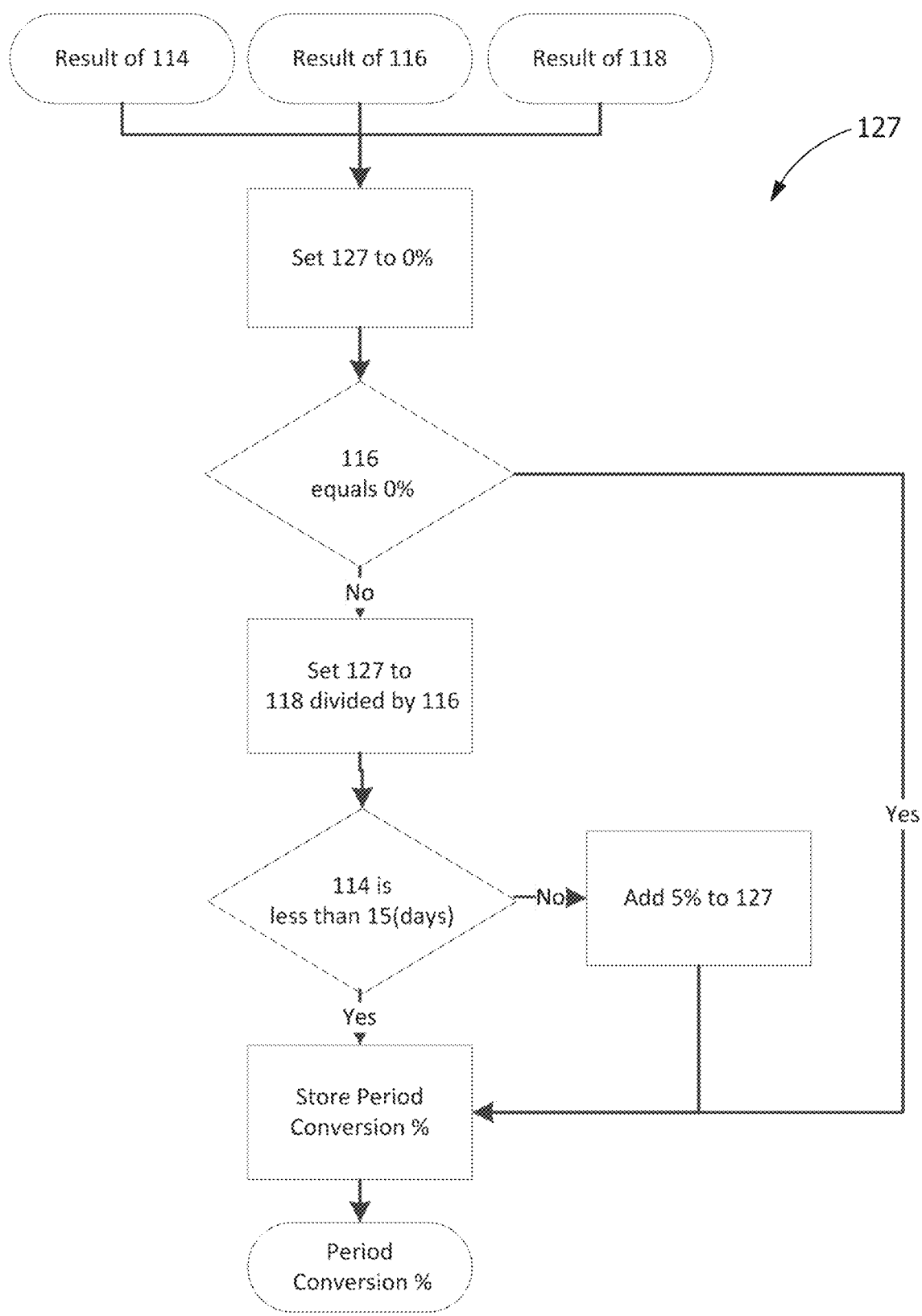
FIG. 7 is a flowchart illustrating one method of calculating a conversion percentage.
Figure 8:
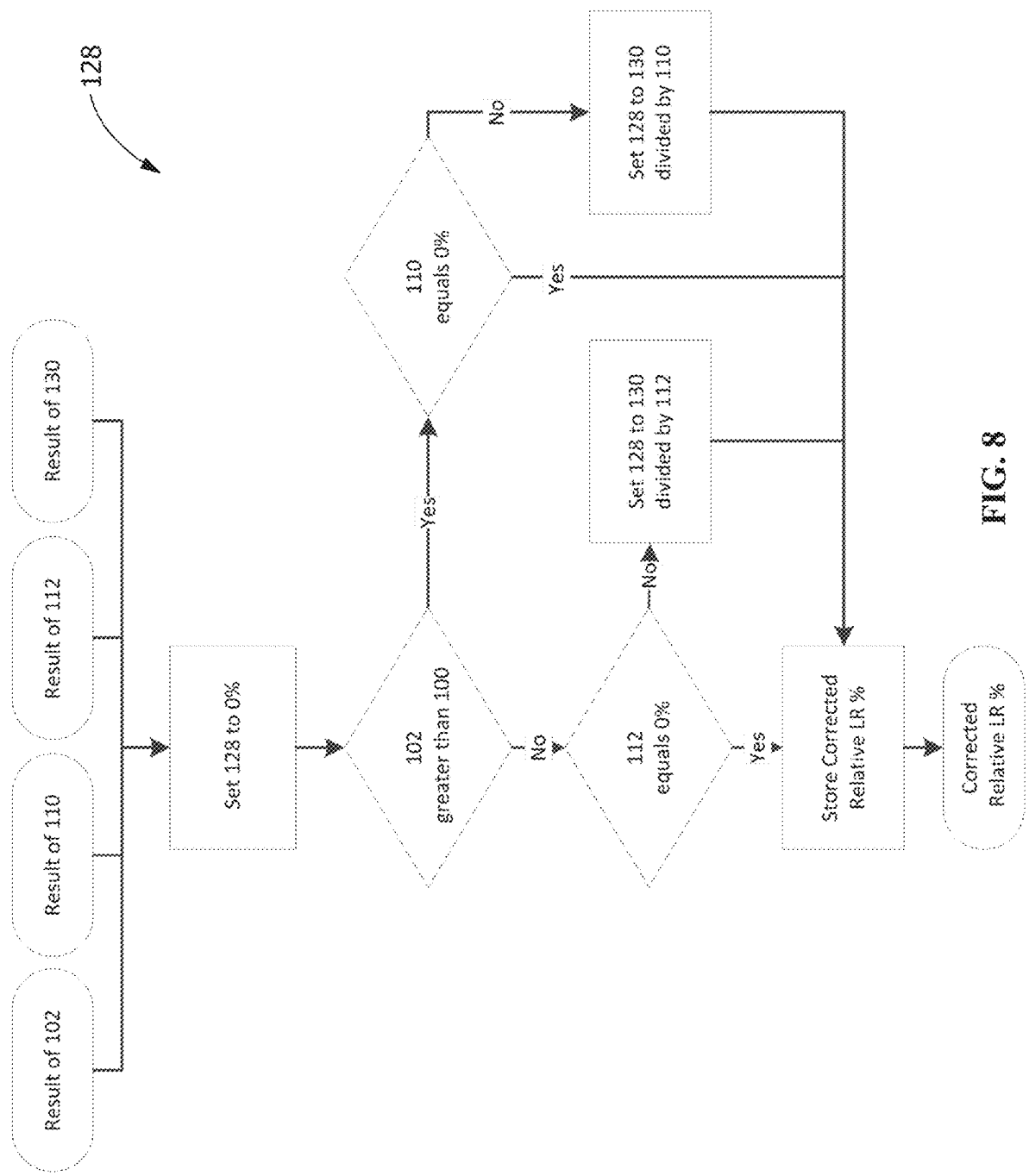
FIG. 8 is a flowchart illustrating one method of calculating a corrected relative lead return percentage.
Figure 9:
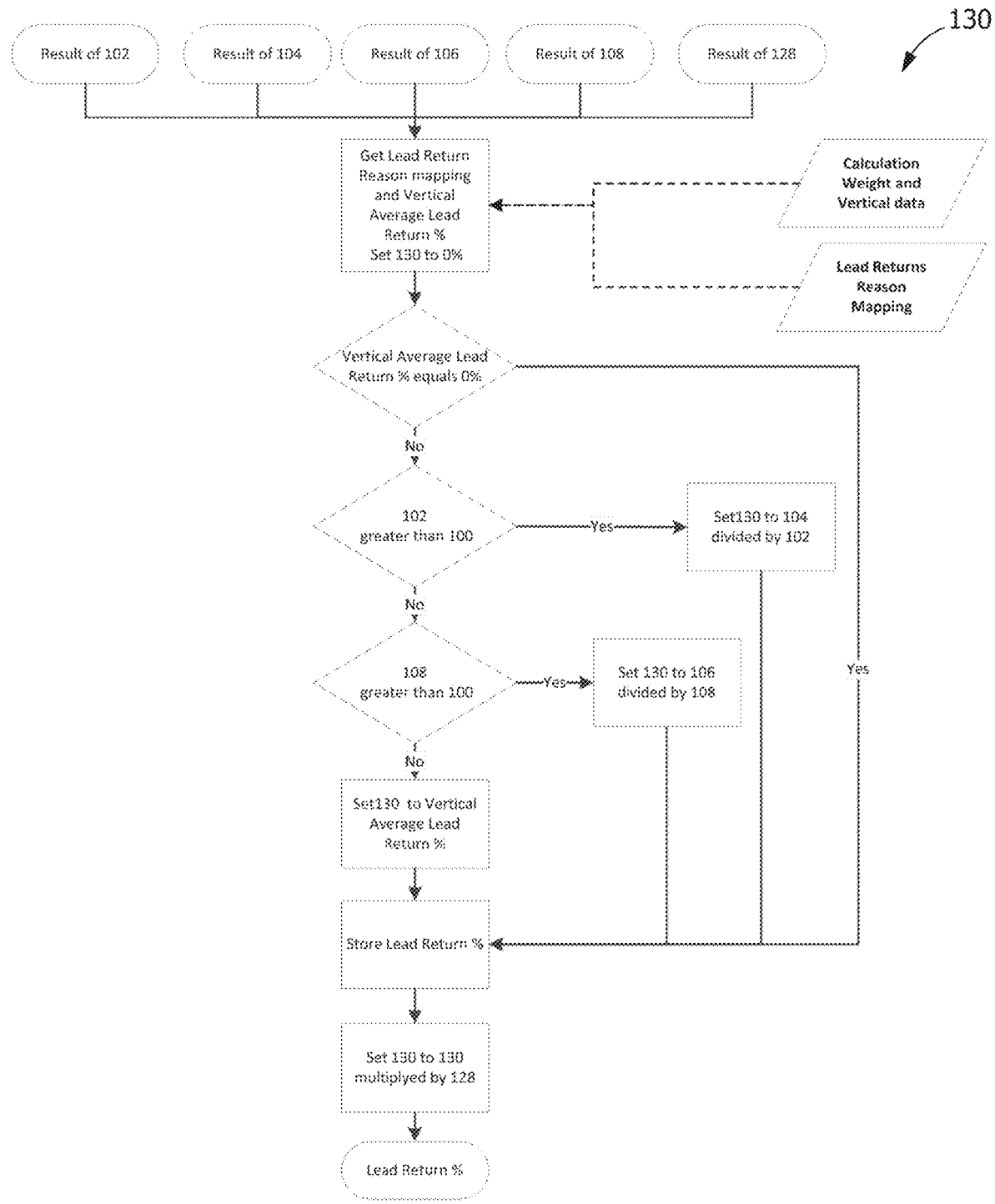
FIG. 9 is a flowchart illustrating one method of calculating a lead return percentage.
Figure 10:
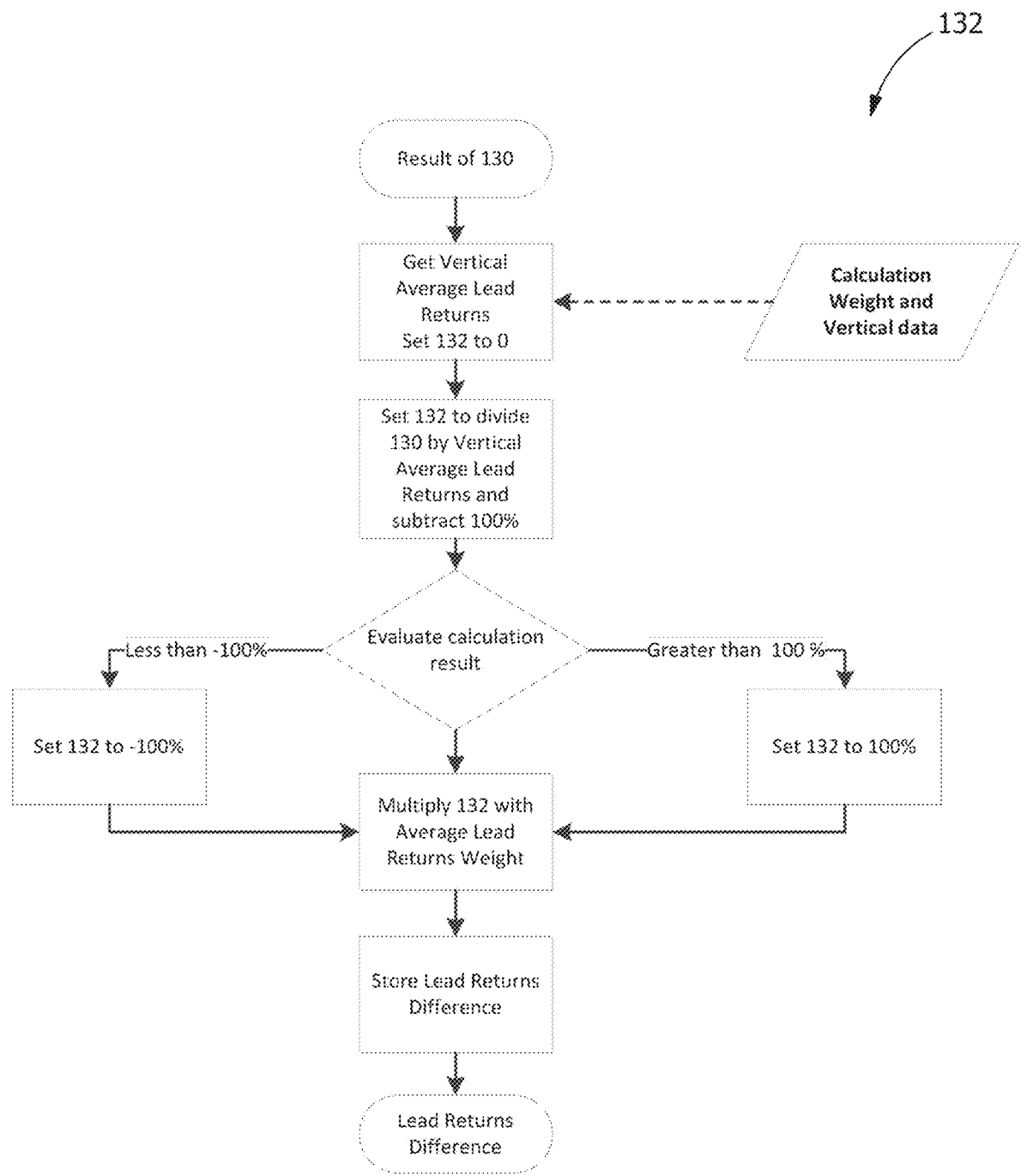
FIG. 10 is a flowchart illustrating one method of calculating a lead return difference.
Figure 11:
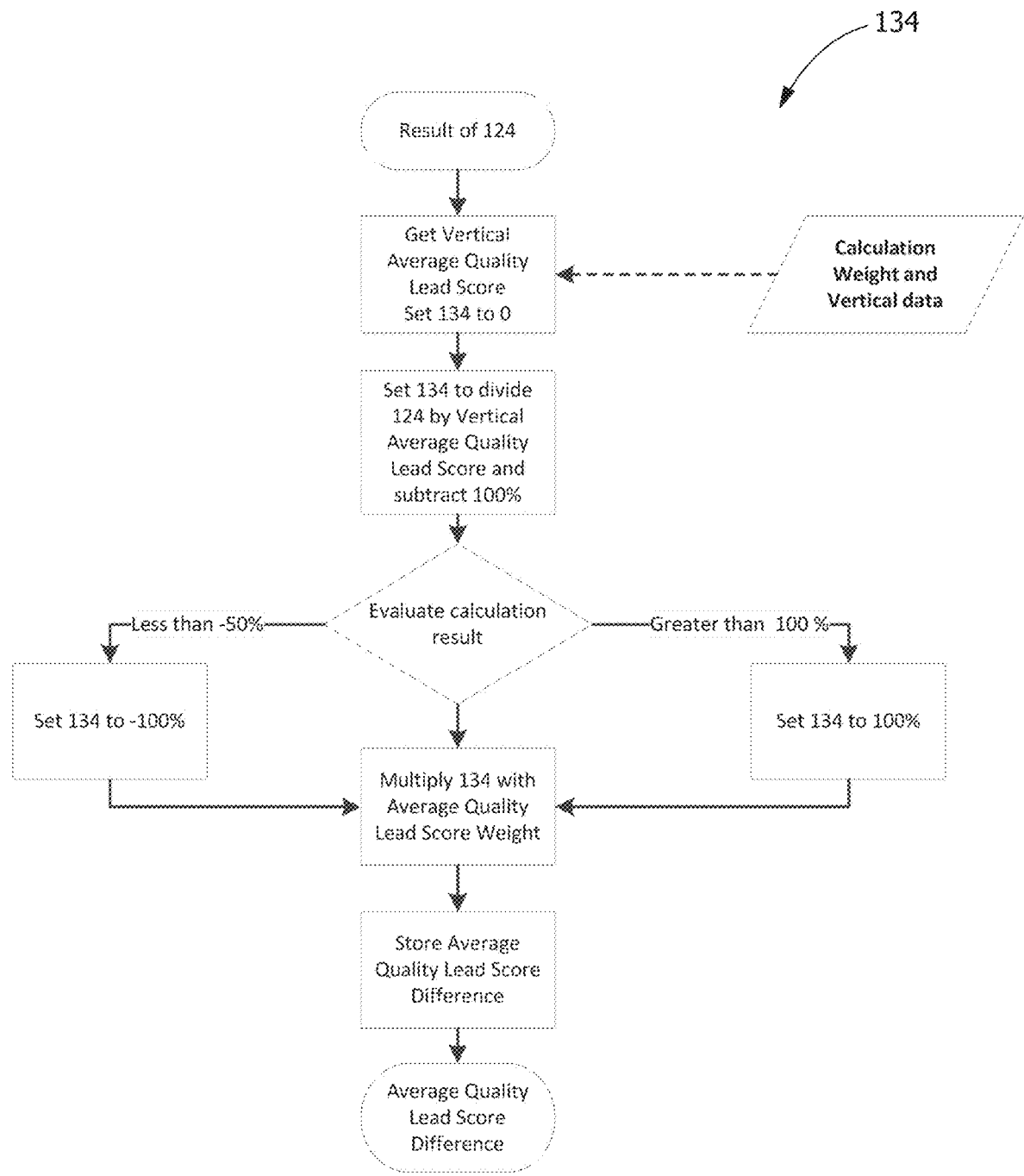
FIG. 11 is a flowchart illustrating one method of calculating an average quality lead score difference.
Figure 12:
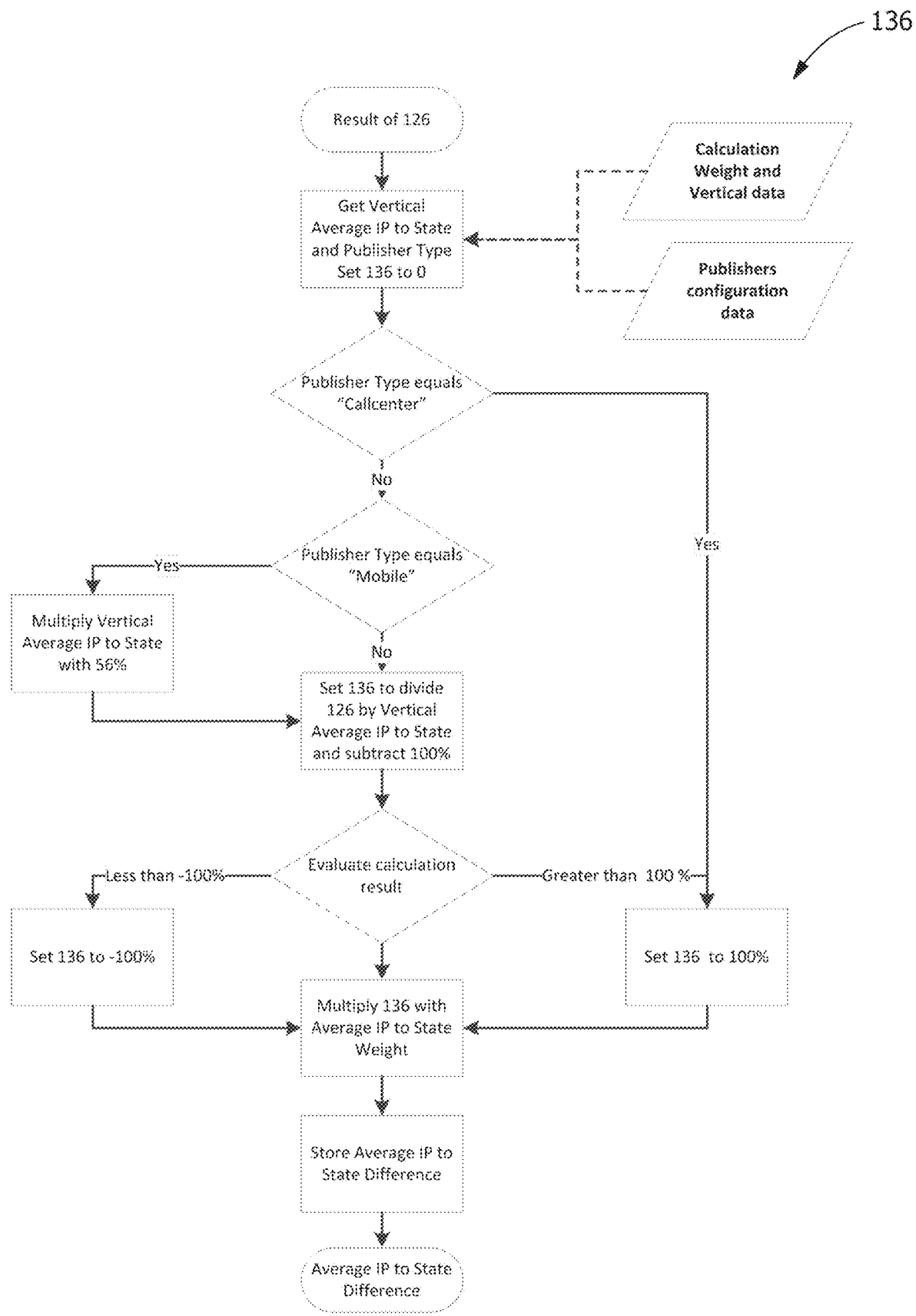
FIG. 12 is a flowchart illustrating one method of calculating an average IP to state difference.
Figure 13:
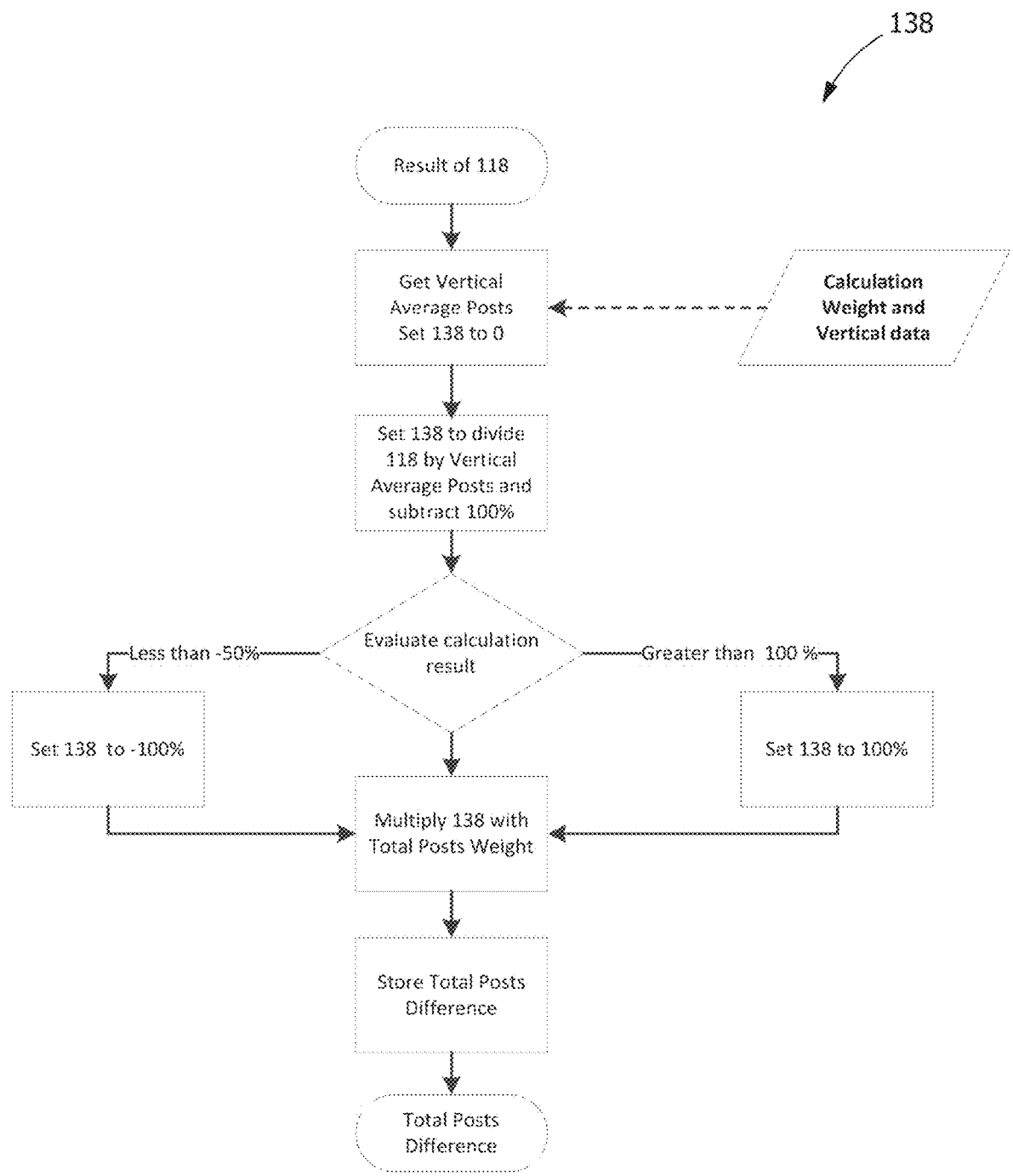
FIG. 13 is a flowchart illustrating one method of calculating a total posts difference.
Figure 14:
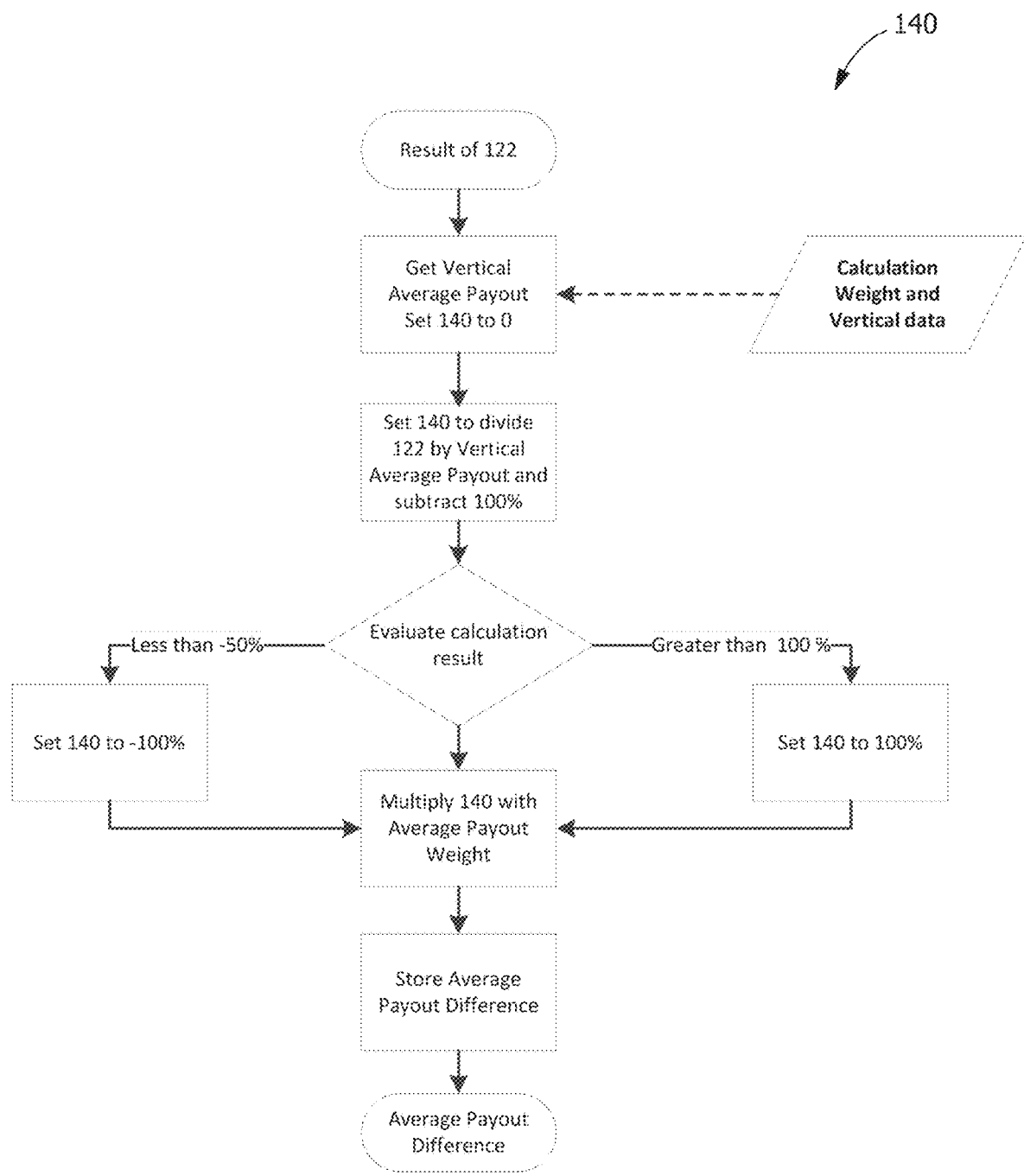
FIG. 14 is a flowchart illustrating one method of calculating an average payout difference.

Calculation 118, Calculation 114 and Calculation 116 render the input necessary to calculate the period conversion percentage 127 (FIG. 7).

The results of above described calculations 130, 124, 126, 118, 122, 120 and 127 are intermediate results that are calculated per unique source (publisher), sub-source, campaign and vertical combination and serve as input to the main elements for calculation of the base quality origin score 146.

By taking the configured weight data for the mam elements and vertical specific data that was calculated, e.g. the average return rate for the vertical, the average payout for the vertical, etc., the main elements calculate the difference to the mean and multiply it with the weight. This gives a final value between (−weight) <value< (+weight). So if the weight of a main element is e.g. 15 the value ranges between −15 and +15.

Figure 15:
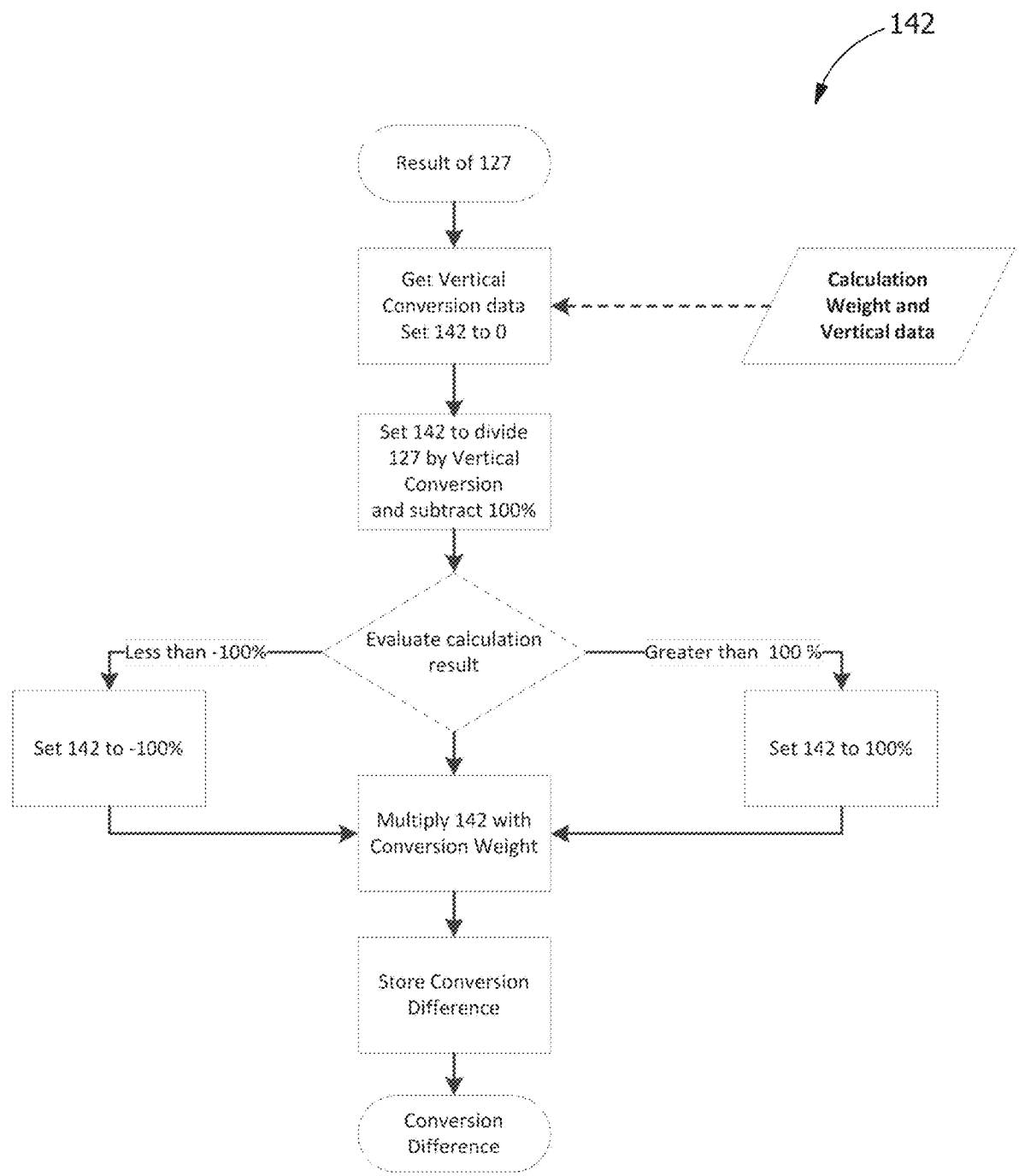
FIG. 15 is a flowchart illustrating one method of calculating a conversion difference.
Figure 16:
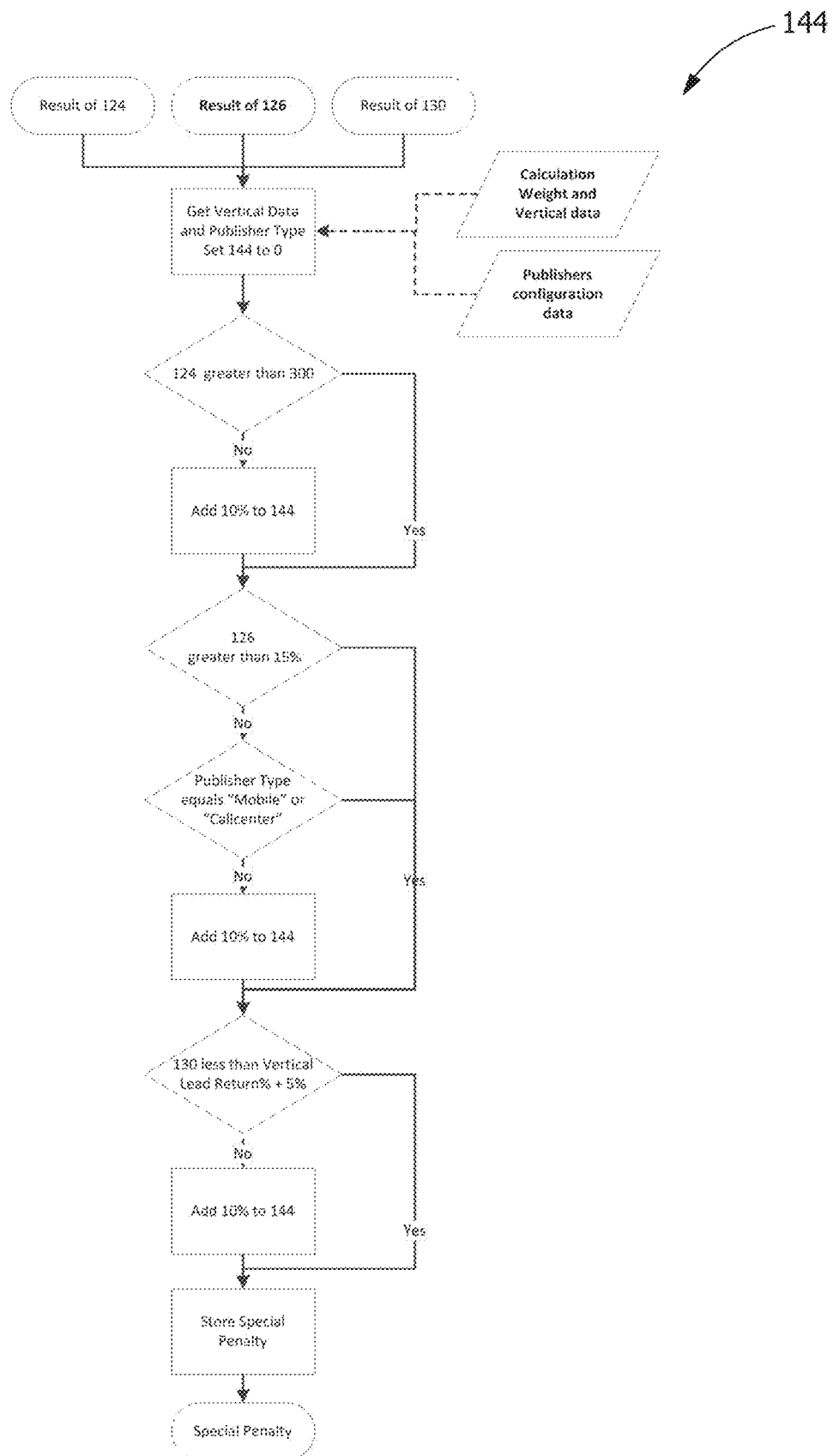
FIG. 16 is a flowchart illustrating one method of calculating a special penalty.
Figure 17:
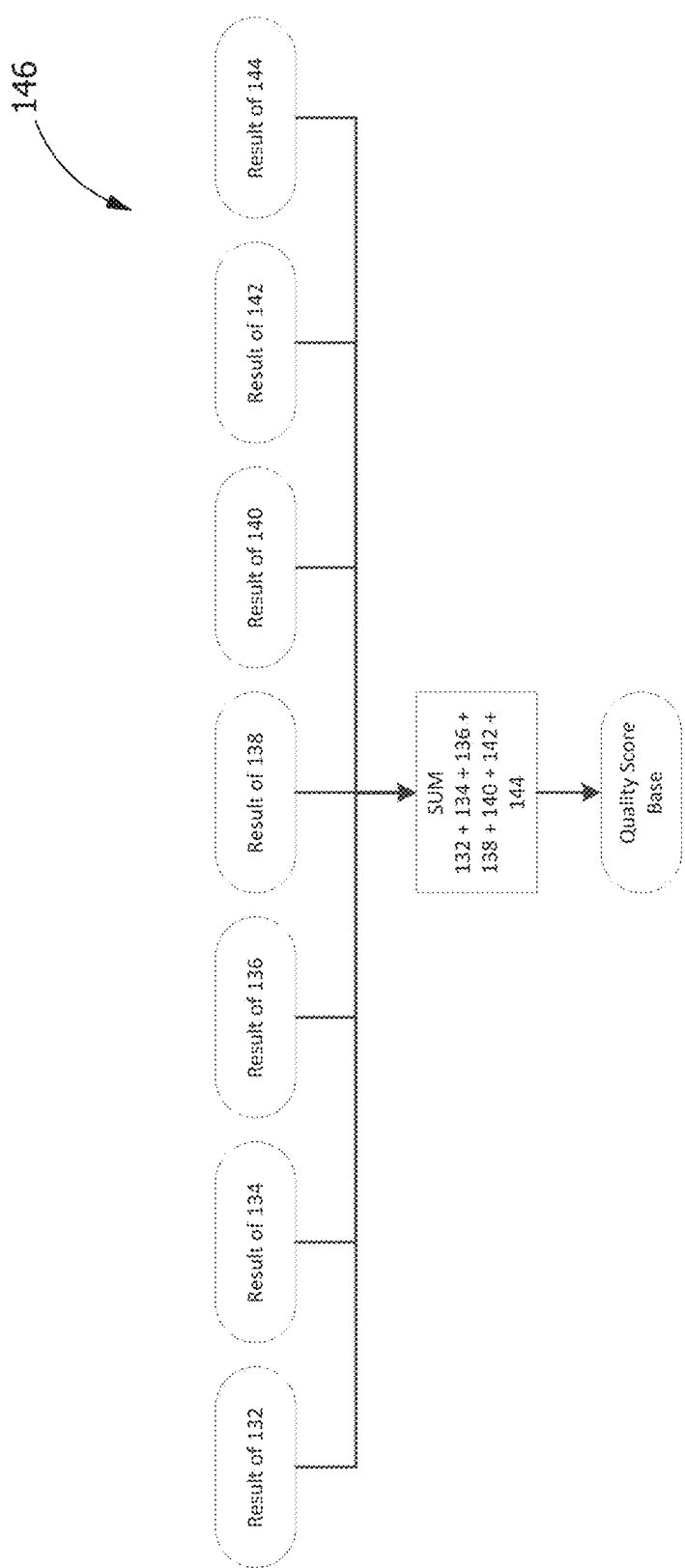
FIG. 17 is a flowchart illustrating one method of calculating a quality score base.
Figure 18:
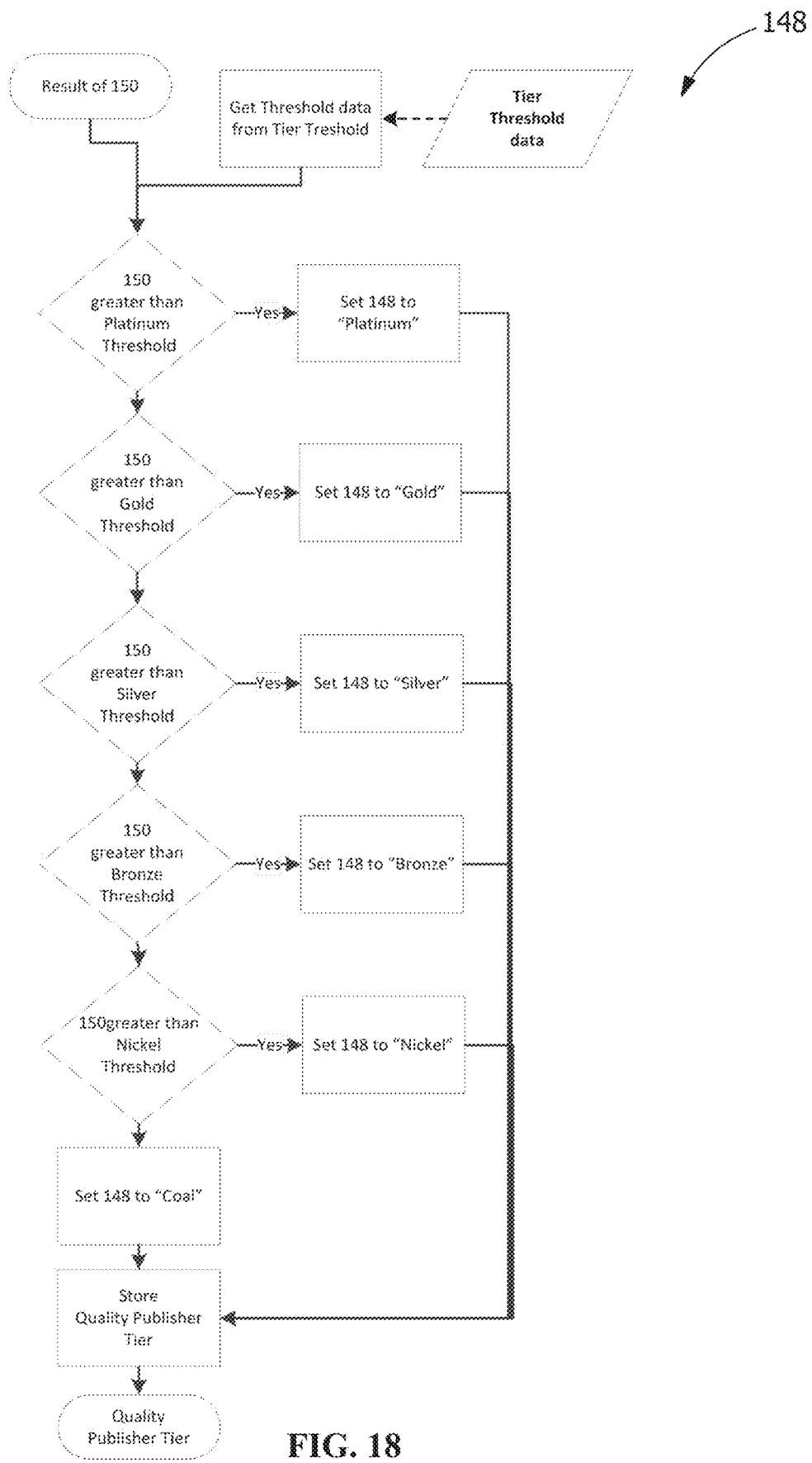
FIG. 18 is a flowchart illustrating one method of calculating a quality published tier.

The main elements are calculated through calculations 132 (FIG. 10), 134 (FIG. 11), 136 (FIG. 12), 138 (FIG. 13), 140 (FIG. 14) and 142 (FIG. 15).

The weight of all main elements added is 100 so a quality origin score base 146 can range from −100 (very bad) to +100 (excellent).

In addition, in various embodiments, a special penalty 144 (FIG. 16) may be applied. The special penalty 144 can be configured to reward certain traffic sources on their configured nature and to penalize or demote others. This is dependent on the type configuration of the publisher or lead source that is determined through configuration and by human business logic. The special penalty 144 also applies if some calculation results are substantially out of average, thereby signaling an early fraud warning.

The quality origin score base 146 (FIG. 17) is calculated by adding the scores of the individual main elements 132, 134, 136, 138, 140 and 142 and the special penalty 144.

To broaden the possible range (in live situations the quality origin score base is between −80% and +70%) to the maximum achievable range (−100 to +100) a multiplication is done, as shown in FIG. 19. To get the number into a humanly understandable range, +100 is added followed by a division by 2. This results in obtaining the final quality origin score 150 per unique source (publisher), sub-source, campaign and vertical combination. Its value ranges from 0 to 100.

Additionally, quality origin score 148 (FIG. 18) may be obtained using the quality origin score 150 and tier threshold data 208 to attach labels to ranges (e.g. Platinum, Gold, Silver, etc.). This allows for even quicker quality perception by humans and allows for easier configuration of the lead exchange main process 100 (i.e. 'send only Gold and Platinum sources to that Buyer').

The above is a continuous and real-time process.

As previously stated, the scoring system and method enhancing a lead exchange is configured to improve the quality of the leads generate and sold to buyers or lead targets 26. The system and method provides insight in the performance of the lead sources or publisher's sources and sub sources. This allows fraud be detected fast, thereby escalating bad performing sources. In addition, accounts with the publishers or sources can be optimized.

The system and method also protects buyers or lead targets 26 from rogue leads as the rogue leads are filtered out. The system and method also determines which leads fit well with particular buyers or lead targets 26. Understanding the quality of the leads generated and sold makes it possible to influence the performance of the leads that each buyer or lead target purchases, which should reduce lead returns and optimize performance.

The system and method also rewards good buyers or lead targets, as the buyers or lead targets that are performing well can be rewarded with better leads.

In one embodiment three different elements are included in the system: the quality of a publisher or lead source (and sub-source), used to influence its margin, the quality publisher tier selection and possible shutdown of a source; the quality of a buyer, used to influence its payout quality in the bid process, daily cap and the position in the tier chain; and the quality of an individual lead, used for price prediction, sell ability and buyer tier selection.

The system scoring mechanism is a relative scoring system, whereby all scorings are meaningful when they are compared to each other. Stated differently, all sources, buyers and leads are scored between −100% till 100%. Each feature either penalizes or rewards the overall system score. Based on the settings in the system per feature (which often will be set at the average), the scoring can be impacted or tweaked, thereby making it easy to change the scoring system to the desired model.

In various embodiments, the parameters and variables of the system are changeable per vertical (for example, but not limited to, auto insurance, health insurance, etc.) and/or per publisher source type (for example, but not limited to, lead, mobile, call center, etc.).

Due to the nature of the data and their timely availability, the system score is generated in part prior to selling the lead and in part after the lead is sold.

Figure 22:
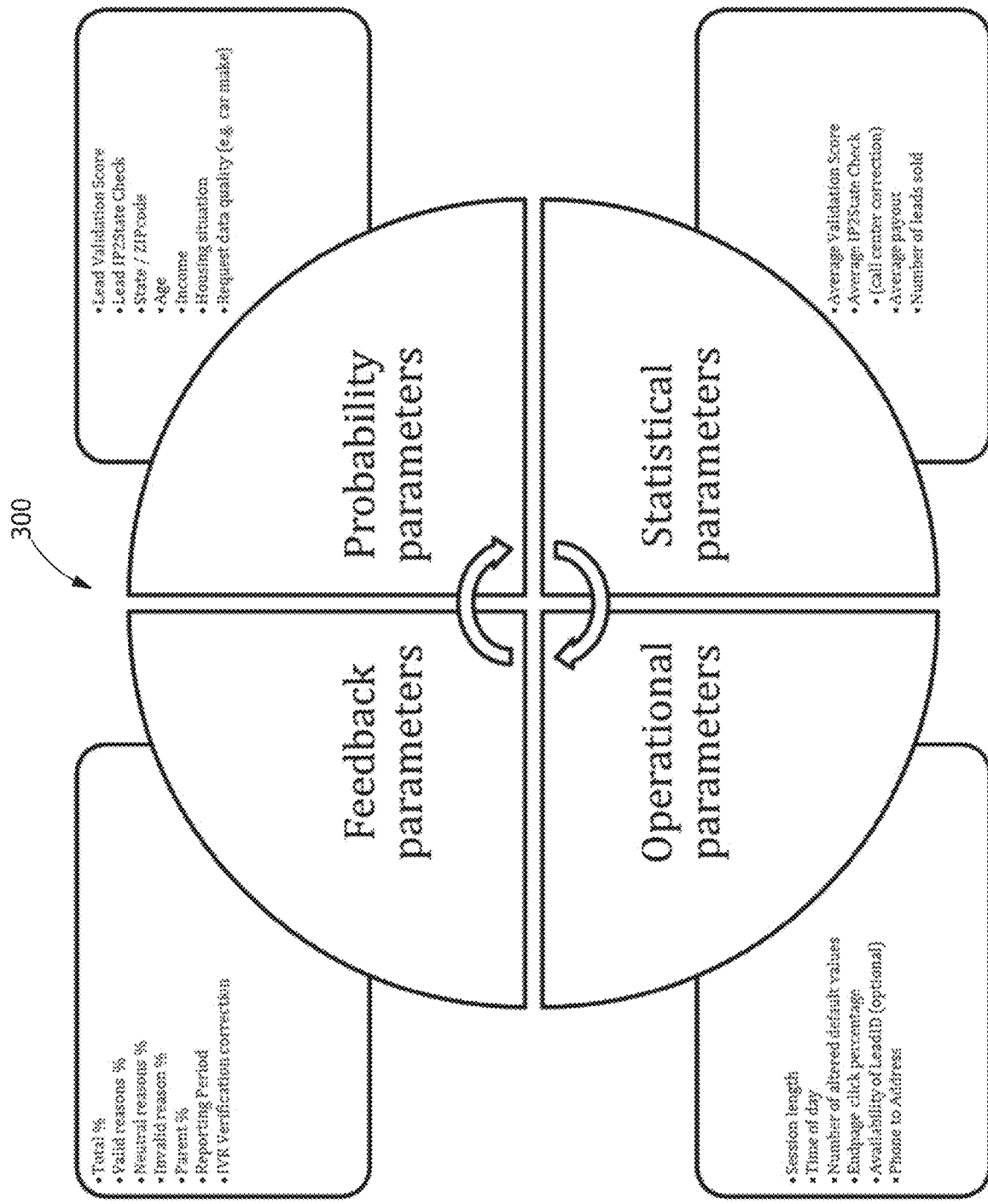
FIG. 22 is a chart illustrating various controls, verification and check features included in an illustrative embodiment of the invention.

The system includes various controls, verification and check features which are summarized and explained below with reference to the chart 300 of FIG. 22 and the example shown in the table 302 of FIG. 20. While FIG. 20 depicts one example, each of the features or parameters can have a different weight, which results in a system scoring percentage.

Data verification will performed to check on accuracy and matching of contact information. The system always receives a data verification score on each lead. This score will be used as one of the drivers to score the contact information provided by the end user.

An IP check will be performed to determine for each lead if the state matches based on the IP address with what the user has claimed is the state in which he or she lives. This scoring feature has a an impact on monitoring fraudulent leads and sources. Mobile and call center sources are scored differently as they cannot meet this criteria.

The higher volume of total leads impacts the scoring. In addition, the higher the average payout, the higher the demand for these type of leads, which is rewarded within the scoring.

The acceptance rate, as shown in FIG. 20, is the percentage of leads sold divided by offer to buyers (for example—100 offered leads to at least 1 buyer with 80 sold leads is a 80% acceptance rate). The dupe filter is the percentage of leads that are signing up multiple times for the same vertical with a set day range. In the example shown the filter is set to one day. The data verification score too low is the percentage of low data verification scores which show a low intent because bad or fake data is entered. With this information it is easy to measure if users are being incentivized to request a quote.

The conversion is calculated as follows: acceptance rate percentage×(100 percent−Dupe filter percentage)×(100 percent−data verification score too low percentage). This number indicates the sell ability of a lead to the buyer or lead target and indicates the strength of the lead or lead source.

Lead returns are classified as feedback and differ from statistical information. Returns and performance data are in most cases not available in real-time. This means that when lead returns are updated every week or month, this data is updated. Since lead returns are always calculated afterwards, in contrast to data verification score and conversion which are calculated in real-time, a quickly improving or quickly degrading publisher or lead source could be too heavily penalized based on a historic lead return percentage. The system has been designed to take this into account.

The reasons for lead returns are evaluated for both the impact on buyers or lead targets and publishers or lead sources. For buyers the system honors valid reasons for returns (if needed checked via a call center) and penalize invalid reasons for returns. For publishers we honor invalid reasons for returns (if needed checked via a call center) and penalize valid reasons for returns. This has a direct impact on the lead return percentage influence within the calculation.

Because lead return data does not always have valid returns, we first of all distinguish the following categories: valid reasons, neutral reasons and invalid reasons. Valid reasons have a much higher weight than neutral or invalid reasons. The table 304 of FIG. 21 provides a listing of representative reasons for return and their associated classification of reasons, which includes valid, neural or invalid.

If provided and activated in a particular embodiment, the plug-in call verification impacts the system score as well. This plug-in will call-verify a certain percentage of leads and is able to measure if the user picked up the phone and stated he or she is interested in receiving a quote. However, in most cases this plug-in will not be activated for the lead source or lead target, and thus will have smaller impact.

Referring now to the operational parameters shown in FIG. 21, the session length refers to the length of time from when a user accesses the form until the form is submitted with the information. The higher the session length, the higher the intent of the user to answer all questions as accurate as possible. Very short session lengths may by indicative of fraud activity.

Certain campaigns and publishers will use the click listing products for extra monetization. If click listings are loaded on for example the end page and the user has a high click through percentage on these listing, the intent of the user is much higher than when users are clicking less.

There are several external lead verification scripts available. When used, the external lead verification scripts can provide insight as to how a lead was generated, thereby providing additional information.

Users are often presented with campaigns that have defaulted values for certain questions. By changing these values, it tends to show users have a higher intent than keeping the defaulted values for these questions and only answering the required questions.

In many instances, the time of the day has an impact on lead quality performance as well. User that are requesting a quote at 4:00 AM in the morning might be less interested than users that request a quote at 12:00 PM. In addition, the performance might also be lower due to later follow up because of the time.

If possible, the address data and phone characteristics are collected based on the user's phone number. This data can be used for verification and possibly 'pro-populating' the users request form. The system alters the weight factor on some other parameters if pre-populated information is used.

Referring now to the probability parameters shown in FIG. 21, one component of probability entails predicting performance based on historic data. There are certain trends, which seem to have an impact not only on pricing, acceptance rate, but also performance, such as, but not limited to: age, state/zip code, income, housing situation and request data quality (e.g. make).

It is possible to deduce a lead scoring, meaning manually influence the scoring based on further feedback or predicted performance based on how a campaign will be promoted. This can be done with respect to lead, origin or buyer.

With targets or buyers this is acceptable because their behavior is more predictable and usually only changes over weeks/months. With sources (publishers) the influence of historic behavior is softened because the nature of their traffic changes fairly rapidly.

The parameters and their attached weight factors will be used for multiple calculations, including, but not limited to: quality of an individual leads, used for price prediction, sell ability and buyer tier selection; quality of a media partner source or lead source (and sub-source), used to influence its margin, the buyer tier selection and possible shutdown of a source; quality of a buyer or lead target, used to influence its payout quality in the bid process, daily cap and the position in the tier chain.

The system score has an impact on the lead distribution to buyers or targets.

Publishers or lead sources are assigned a certain tier based on their performance. This tier will determine the buyer mix of all or parts of its leads. Automatic and temporary blocks might be put in place based on this performance. The system will treat call center and mobile sources differently.

Buyers or targets are also placed within a tier, based on their performance.

The system scoring has an impact on certain requests for quotes (leads). The leads may be completely or partially filtered out based on the scoring. It is therefore possible users never receive a quote.

The system and method of enhancing the lead exchange process simultaneously and in real-time calculates a quality index of a lead or plurality of leads within the lead exchange process. The quality index provide a measure of the quality of the leads with the lead exchange process. The calculations are done electronically by a computer system and are based on differences to the mean, allowing for relative indices, which permit the use in a dynamic environment.

The system and method may include pluggable subprocesses which provide input for the calculation process. The method is configured to process data in an incremental fashion.

The system and method retrieves input for a number of different parameters. The parameters may be grouped into categories, which include statistical data, feedback data, operational data and probability data. Each parameter has its own weight within the lead exchange process and its own basic calculation formula. At least one parameter is built from multiple sub-parameters.

Each parameters may be organized in cells, with each cell having its own input parameter, weight and algorithm, and with each cell differing in type, weight and severity. The cells may be organized in arrays of cells, which may be organized in rows. The rows may be organized in columns, creating a matrix.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of enhancing a lead exchange process, the method comprising:
   receiving a plurality of leads, each lead comprising a plurality of lead parameters;
   organizing, using one or more processors, the plurality of leads into a matrix, the matrix comprising:
      a first array storing a matrix-specific process for calculating a quality index for the plurality of leads and one or more matrix-specific values indicative of the quality index for the plurality of leads, and
      a plurality of second arrays, each second array corresponding to a lead of the plurality of leads and comprising:
         a plurality of second cells, each second cell comprising a lead parameter of the plurality of lead parameters of the lead, a parameter weighting corresponding to the lead parameter, and a parameter-specific process corresponding to the lead parameter, and
         a first cell storing a lead-specific process for calculating a lead quality index for the lead and one or more values indicative of a relationship between the plurality of second cells, and
   calculating, using the one or more processors, a first lead quality index for each lead of the plurality of leads using the lead-specific process corresponding to the each lead, wherein the first lead quality index for the each lead is determined using the lead parameter of each second cell of a respective second array;
   storing in the first cell of each second array of the plurality of second arrays, a corresponding first lead quality index;
   calculating a first quality index for the plurality of leads using the matrix-specific process, wherein the first quality index for the plurality of leads is calculated using the first lead quality index for each lead of the matrix;

storing in the first array of the matrix, the first quality index for the plurality of leads;

retrieving input for a set of input parameters corresponding to a set of lead parameters of the matrix; and processing the set of input parameters in an incremental fashion.

2. The method of claim 1, wherein processing the set of input parameters comprises processing the set of input parameters through inverted calculation.

3. The method of claim 1, wherein the input for the set of input parameters is retrieved using one or more pluggable sub-processes.

4. The method of claim 1, wherein the plurality of lead parameters of at least one lead of the plurality of leads are grouped into a category of a set of categories, the set of categories comprising statistical data, feedback data, operational data, and probability data.

5. The method of claim 1, wherein the plurality of lead parameters of each lead of the plurality of leads are grouped into a category of a set of categories, the set of categories comprising statistical data, feedback data, operational data, and probability data.

6. The method of claim 1, wherein at least one parameter of the plurality of lead parameters of a particular lead of the plurality of leads includes a plurality of sub-parameters.

7. The method of claim 1, wherein processing the set of input parameters in an incremental fashion comprises:

replacing, using the one or more processors, the set of lead parameters with the set of input parameters;

calculating a second lead quality index for each lead of a set of leads of the plurality of leads, wherein each lead of the set of leads includes one or more input parameters of the set of input parameters that replaced one or more lead parameters of the plurality of lead parameters of the each lead, wherein the second lead quality index of a particular lead is calculated using only the first lead quality index of the particular lead, the one or more lead parameters of the particular lead, and the one or more input parameters that replaced the one or more lead parameters of the particular lead;

for each second array corresponding to a lead of the set of leads, storing in the first cell of the each second array, the respective second lead quality index;

calculating in real-time, using the one or more processors, a second quality index for the plurality of leads using only the first quality index for the plurality of leads, each calculated second lead quality index, and each first lead quality index that was used to calculate at least one second lead quality index; and storing the second quality index for the plurality of leads in the first array.

8. The method of claim 1, wherein each second cell of the plurality of second cells of a particular second array of the plurality of second arrays includes a different parameter weighting.

9. A method of enhancing a lead exchange process, the method comprising:

receiving input for a set of input parameters, wherein the set of input parameters correspond to a set of lead parameters of a matrix, the matrix comprising:

a first array storing a first quality index for a plurality of leads and a matrix-specific process for calculating the first quality index for the plurality of leads, and a plurality of second arrays, each second array corresponding to a lead of the plurality of leads and comprising:

a plurality of first cells, each first cell comprising a lead parameter of a plurality of lead parameters of the lead and a parameter-specific process corresponding to the lead parameter, and a second cell storing a first lead quality index for the lead and a lead-specific process for calculating the first lead quality index, replacing, using one or more processors, the set of lead parameters with the set of input parameters;

calculating a second lead quality index for each lead of a set of leads of the plurality of leads, wherein each lead of the set of leads includes one or more input parameters of the set of input parameters that replaced one or more lead parameters of the each lead, wherein the second lead quality index of a particular lead is calculated using the first lead quality index of the particular lead, the one or more lead parameters of the particular lead, and the one or more input parameters that replaced the one or more lead parameters of the particular lead, wherein the second lead quality index for the particular lead is calculated without using lead parameters of the particular lead that are unaffected by the one or more input parameters;

for each second array corresponding to a lead of the set of leads, replacing in the second cell of the respective second array, the first lead quality index with a respective second lead quality index;

calculating, using the one or more processors, a second quality index for the plurality of leads using only the first quality index for the plurality of leads, each calculated second lead quality index, and each first lead quality index that was used to calculate at least one second lead quality index; and replacing the first quality index for the plurality of leads in the first array with the second quality index for the plurality of leads.

10. The method of claim 9, wherein the set of input parameters are received via one or more pluggable sub-processes.

11. The method of claim 9, wherein the plurality of lead parameters of at least one lead of the plurality of leads are grouped into a category of a set of categories, the set of categories comprising statistical data, feedback data, operational data, and probability data.

12. The method of claim 9, wherein the plurality of lead parameters of each lead of the plurality of leads are grouped into a category of a set of categories, the set of categories comprising statistical data, feedback data, operational data, and probability data.

13. The method of claim 9, wherein at least one parameter of the plurality of lead parameters of a particular lead of the plurality of leads includes a plurality of sub-parameters.

14. The method of claim 9, wherein the first lead quality index of a particular second array is calculated using each lead parameter of the first plurality of cells and the lead-specific process stored in the second cell of the particular second array.

15. The method of claim 9, wherein each first cell of the plurality of first cells of a particular second array of the plurality of second arrays includes a parameter weighting for the respective lead parameter.

16. The method of claim 15, wherein the first lead quality index of a particular second array is calculated using each lead parameter of the first plurality of cells, each parameter weighting of the first plurality of cells, and the lead-specific process stored in the second cell of the particular second array.

17. A method of reducing computer operations on data stored in multi-dimensional matrices, the method comprising:
- maintaining, using one or more processors, one or more multi-dimensional matrices, each of the one or more multi-dimensional matrices comprising:
- a plurality of matrices, each matrix comprising:
  - a plurality of non-dominant arrays, each non-dominant array comprising:
    - a plurality of non-dominant cells, each non-dominant cell comprising an input parameter, a parameter weighting corresponding to the input parameter, and a parameter-specific process corresponding to the input parameter, and
    - a dominant cell storing an array-specific process and values indicative of a relationship between the plurality of non-dominant cells, and
  - a dominant array storing a matrix-specific process and matrix-specific values;
- determining, using the one or more processors, a first array-specific value for each of the plurality of non-dominant arrays of the plurality of matrices using the corresponding array-specific process, wherein the first array-specific value for a particular array is determined using each input parameter in each non-dominant cell of the particular array;
- determining, using the one or more processors, a first matrix-specific value for each matrix of the plurality of matrices using the corresponding matrix-specific process wherein the first matrix-specific value for a particular matrix is determined using each first array-specific value of each non-dominant array of the particular matrix;
- identifying, using the one or more processors, a plurality of replacement input parameters to replace a plurality of input parameters stored in the plurality of non-dominant cells;
- replacing, using the one or more processors, the plurality of input parameters with the plurality of replacement input parameters;
- determining in real-time, using the one or more processors, a second array-specific value for each non-dominant array that comprises one or more replacement input parameters of the plurality of replacement input parameters using only the first array-specific value, the one or more replacement input parameters, and one or more input parameters of the plurality of input parameters that were replaced by the one or more replacement input parameters;
- replacing for each non-dominant array that comprises one or more replacement input parameters of the plurality of replacement input parameters, the first array-specific value with the second array-specific value;
- determining in real-time, using the one or more processors, a second matrix-specific value for each matrix that comprises one or more second array-specific values using only the first matrix-specific value of the each matrix, the one or more second array-specific values, and one or more first array-specific value that were replaced by the one or more second array-specific values; and
- replacing for each matrix that comprises one or more second array-specific values, the first matrix-specific value with the second matrix-specific value.

18. The method of claim 17, wherein at least one input parameter of a non-dominant cell of a non-dominant array of the plurality of non-dominant arrays includes a plurality of sub-parameters.

19. The method of claim 17, wherein each non-dominant cell of a non-dominant array of the plurality of non-dominant arrays includes a different parameter weighting.

20. The method of claim 17, wherein the plurality of replacement input parameters are received via one or more pluggable sub-processes.

* * * * *